United States Patent [19]
Zeiber

[11] Patent Number: 5,937,899
[45] Date of Patent: Aug. 17, 1999

[54] FARM COUPLING INCLUDING A VENT VALVE

[75] Inventor: Dennis Zeiber, Erie, Pa.

[73] Assignee: Snap-Tite Technologies, Inc., Wilmington, Del.

[21] Appl. No.: 09/037,461

[22] Filed: Mar. 10, 1998

Related U.S. Application Data

[63] Continuation-in-part of application No. 09/020,447, Feb. 9, 1998.
[51] Int. Cl.[6] ............................................. F16L 37/28
[52] U.S. Cl. ................. 137/614; 137/614.05; 251/149.6; 285/924
[58] Field of Search ..................... 137/614.04, 614.05, 137/614.03, 614; 251/149.6; 285/924

[56] References Cited

U.S. PATENT DOCUMENTS

| | | | |
|---|---|---|---|
| 3,730,221 | 5/1973 | Vik .......................................... | 137/614 |
| 4,303,098 | 12/1981 | Shindelar ........................ | 137/614.05 X |
| 4,598,896 | 7/1986 | Maldavs ......................... | 137/614.04 X |
| 4,881,573 | 11/1989 | Durant et al. ................... | 137/614.04 X |
| 5,730,185 | 3/1998 | Wilkins et al. ................. | 137/614.05 X |

*Primary Examiner*—Kevin Lee
*Attorney, Agent, or Firm*—Woodling, Krost & Rust

[57] ABSTRACT

A coupling comprising a male portion and a female portion wherein the female portion comprises: a housing, an inner body member positioned within the housing and slidable relative thereto, a relief valve positioning member, a piston residing intermediate the relief valve positioning member and the inner body member and slidable relative to the positioning member and the inner body member, and a valve. The housing includes a first port and a second port. The inner body member includes a port communicating with the first port of the housing. The relief valve positioning member includes a relief valve. The piston includes an interior, an exterior, and a passageway interconnecting the interior of the piston and the exterior of the piston. The valve slidably engages the piston and seats against the inner body member. The male portion of the coupling engages the inner body of the female portion. A chamber is formed between the piston and the relief valve positioning member which, when pressurized, results in the movement of the positioning member when the inner member is moved leftwardly during coupling with the male portion. Movement of the inner body of the female portion moves the relief valve positioning member axially away from the male member opening the relief valve and venting the female member through the second port of the housing of the female member.

8 Claims, 21 Drawing Sheets

FARM COUPLING INCLUDING A VENT VALVE

This application is a continuation in part of prior U.S. application Ser. No. 09/020,447 filed Feb. 9, 1998.

FIELD OF THE INVENTION

The invention disclosed herein relates to couplings used on agricultural implements, namely, tractors. The female half of the coupling is typically mounted on the tractor. The female half of the coupling mates with a male half and fluid flows therethrough to power auxiliary equipment. The male half of the coupling is connected to a hose or other conduit which supplies auxiliary equipment. This invention is directed toward the enablement of easy coupling and uncoupling of the male and female halves. Both processes, coupling and uncoupling, occur when vent the vent valve of the instant invention relieves the internal pressure on the female valve. Easy uncoupling, with very little spillage occurs because the male valve closes against an unpressurized female valve.

BACKGROUND OF THE INVENTION

U.S. Pat. No. 4,077,433 to Maldavs illustrates a piston valve arrangement with a passageway through the valve to assist in assuring that the male ball valve remains open in high flow conditions from the male to the female. U.S. Pat. No. 4,881,573 to Durant illustrates a coupler having two poppet valves. The first poppet engages a ball check valve formed in the male coupling and the second poppet is actuated by a manually operated cam. A passageway exists in the piston to allow fluid to be vented or to pressurize the female valve.

U.S. Pat. No. 4,598,896 to Maldavs illustrates a coupler having a spool and a port within the pool. An annular seal is fixedly positioned about the port in the spool. The spool is slidable with respect to the seal which enables pressure to be relieved in the female during coupling and uncoupling with the male. U.S. Pat. No. 4,303,098 to Shindelar discloses a coupler having a female half which includes a female valve having an elongated stem for engaging the male half. The female half of the coupling is vented by a pivotable cam which moves the inner member of the female half to release its locking means and then opens a poppet valve to open the outlet port.

U.S. Pat. No. 4,249,572 to Shindelar et al. discloses a female half which is self-relieving. The female half includes dual poppet valves which are linked together. One of the poppet valves vents the female half of the coupling when the male and female valves are disengaged and uncoupled.

None of the prior art, however, provides a male half of the coupling which pushes the inner body of the pressurized female half of the coupling (which includes a pressurized chamber between a piston and a relief valve positioning member) causing the positioning member to be displaced in a leftward or rearward direction which causes the venting of the female member. Similarly, the male half of the coupling in the instant invention pulls the inner body of the female half of the coupling rightwardly or forwardly which causes the venting of the female member. Different embodiments of the venting mechanism are disclosed herein.

Also, a manual venting mechanism is disclosed herein. The manual venting mechanism must be operated each time the coupling is made or broken.

SUMMARY OF THE INVENTION

It is an object of the present invention to provide a coupling which may be used on agricultural implements. Typically, the female half of the coupling is mounted on a tractor and pressurized hydraulic fluid is supplied thereto. The female coupling includes inlet and outlet ports. The inlet port is connected to a pressure source and the outlet port is connected to a sump or reservoir for recycling back to a pump. The female half of the coupling is capable of being joined with a male half of the coupling. The male half of the coupling is typically connected to an implement which does work of some kind. It is an object of the invention to provide a relief mechanism in the female half of the coupling such that pressure is relieved inside the female half of the coupling when the male half is being coupled or uncoupled to the female half. This enables easy coupling and uncoupling and minimizes any fluid spillage.

The female half of the coupling may or may not be pressurized in the uncoupled condition. The pressure source to the female half of the coupling is isolated when the coupling is disconnected. Sometimes, however, pressure is trapped between the isolation valves in the conduit leading to the inlet port and the female half of the coupling in the disconnected/uncoupled state. The male half of the coupling is typically pressurized as the pressure generated by the fluid is trapped within the coupling upon disconnection from the female half.

It is an object of the instant invention to provide a vent valve in the female half of the coupling to relieve pressure within the female half of the coupling in two circumstances. The first circumstance is when the male half enters the pressurized female inner member. The inner body member is movable relative to the female outer body/housing. A threaded sleeve is threaded to the female body/housing. A vent valve resides in a relief valve positioning member. A spring resides intermediate a plug and the vent valve. The spring is compressed as the vent valve is moved along the varying contour of the sleeve. When the vent valve is depressed it allows fluid within the female half of the coupling to escape to the vent return passage. The vent return passage is at or near atmospheric pressure. The vent return passage can be connected to a reservoir for recycling the hydraulic fluid which is typically used in agricultural implements associated with tractors.

In further describing the first circumstance of venting, the male member engages the inner body member and moves it leftwardly when viewing FIG. 1. As inner body member moves leftwardly, the relief valve positioning member moves leftwardly relative to the sleeve which is fixed to the female body/housing. A pressurized chamber is formed between the piston and the relief valve positioning member. The relief valve positioning member is restrained from movement in one direction by a snap ring residing in a groove in the interior of the inner body member. As this leftward movement continues, the vent valve is depressed as it moves along the varying contour of the inner sleeve. This vents any fluid that may be inside the piston, the chamber and the inner body member . While this is happening, female valve is closed. Once the pressure is released inside the female half of the coupling, the valve may then open.

The male half of the coupling is coupled to the female half through the interaction of the locking sleeve, springs, a washer and detent members or balls. The inlet pressure port supplies pressure to the coupling. A passageway through the inner body member leads to a passageway which leads around the female valve to the male member. The male valve abuts female valve in the coupled condition.

In the second circumstance of venting, when the male member is retracted from the female member, the male member is pulled rightwardly when viewing FIG. 1. As the male member is pulled rightwardly it brings with it the inner body member of the female member. The inner body member moves relative to the fixed body/housing. A snap ring resides in the inner body member and engages the relief valve positioning member and pulls it rightwardly. As the relief valve positioning member is pulled rightwardly, vent valve relieves the pressure along the interface of the valve positioning member and the sleeve. Fluid will continue to flow to the vent passage until the male valve closes and pressure is relieved from the chamber (sometimes referred to herein as the valve actuating pressure chamber) formed by the piston and relief valve positioning member. When the female member's valve closes under the urging of a spring, pressure is equalized within the valve actuating pressure chamber and the relief valve positioning member shuttles to the normal position closing off the flow to the vent. It will be observed that the vent valve has seals around it which prevent leakage.

It is a further object of the present invention to provide a coupling whose female portion thereof includes a relief valve positioning member comprised of two portions.

It is a further object of the present invention to provide a coupling whose female portion thereof includes a relief valve positioning member which includes at least one vent valve therein.

It is a further object of the present invention to provide a coupling whose female portion thereof includes a relief valve positioning member which is positioned by an inner body member operated in combination with a spring, a valve and a piston.

It is a further object of the present invention to provide a coupling which includes locking means which interact with the inner body member of the female coupling.

It is an object of the invention to provide a coupling having a vent mechanism movable with an inner body member.

It is an object of the invention to provide a coupling having a vent mechanism comprising a tire valve movable with an inner body member.

It is an object of the invention to provide a coupling having a vent mechanism which is manually operable by a lever or similar structural and also is operable by virtue of the male half of the coupling being urged leftwardly in the female half of the coupling.

A better understanding of the invention will be had when reference is made to the Brief Description of the Drawings, Description Of The Invention, and Claims which follow hereinbelow.

BRIEF DESCRIPTION OF THE DRAWINGS

FIG. 9 is cross-sectional view of the invention illustrating the male half of the coupling just beginning to enter the female half.

FIG. 10 is a cross-sectional view illustrating the male half of the coupling engaging the female half urging the inner body member of the embodiment leftwardly venting the female half of the coupling.

FIG. 11 is a cross-sectional view showing further engagement of the male half of the coupling and venting of the female half of the coupling.

FIG. 12 is a cross-sectional view of the coupling fully engaged with the male and female valves open.

FIG. 13 is a cross-sectional view of the coupling in the process of being uncoupled which occurs when the male half of the coupling is urged leftwardly to vent the female half of the coupling.

FIG. 14 is a cross-sectional view of the coupling after the female half have been depressurized.

FIG. 15 is a cross-sectional view of the coupling illustrating rightwardly movement of the inner body member of the female half during the uncoupling process.

FIG. 16 is a cross-sectional view of the coupling in the uncoupled condition.

FIG. 20 is an enlarged view of the venting mechanism illustrated in FIGS. 9–16 shown venting the female half of the coupling.

DESCRIPTION OF THE INVENTION

Figure 1:
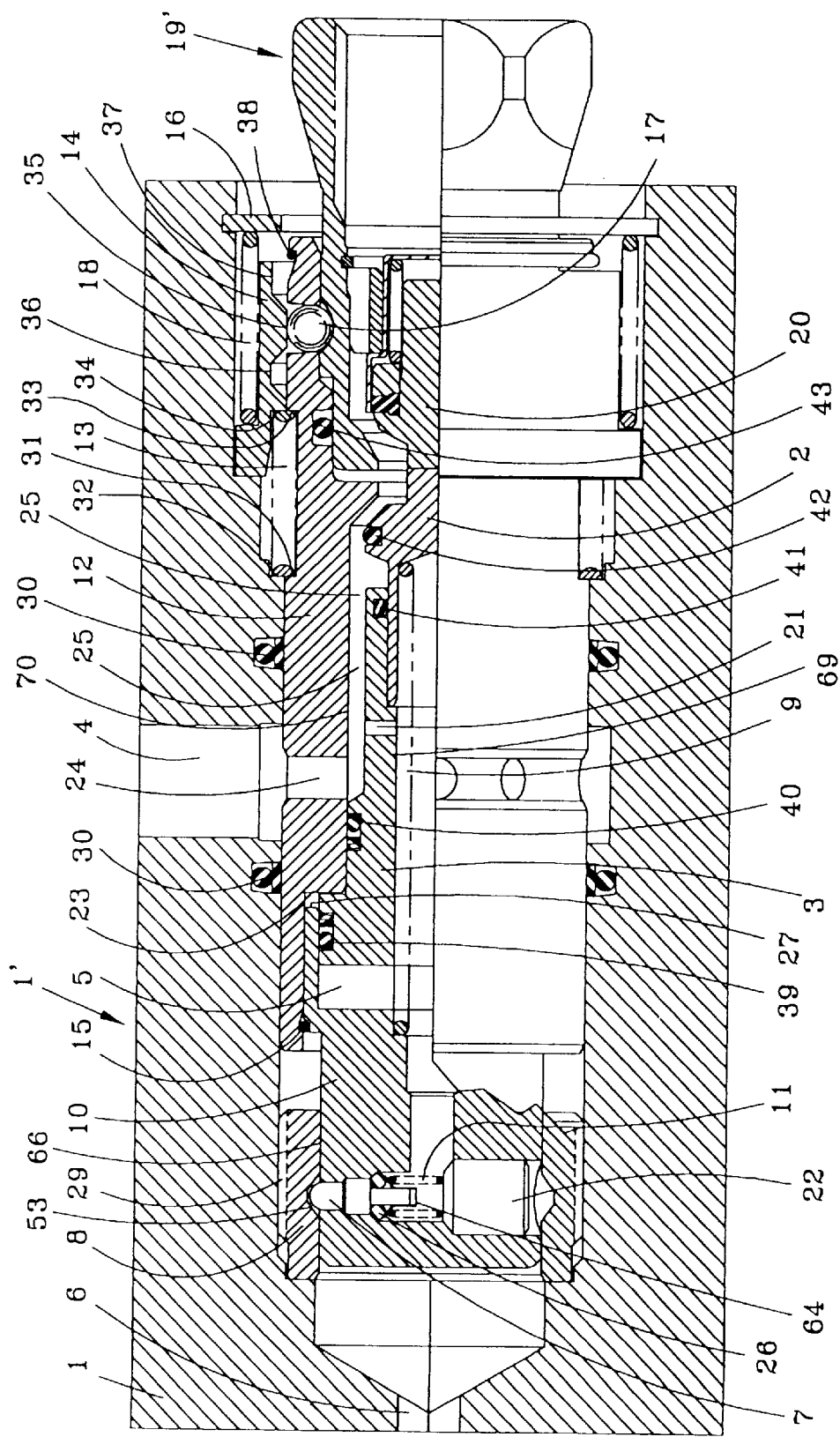
FIG. 1 is a partial cross-sectional view of the male and female halves of the coupling in the coupled condition.

FIG. 1 is a partial cross-sectional view of the male and female halves of the coupling in the coupled condition. A coupling comprising a male portion 19' and a female portion 1' is disclosed. The female portion includes: a housing 1, an inner body member 12 positioned within the housing and slidable relative thereto, a relief valve positioning member 10 and a valve 2. A piston 3 resides intermediate the relief valve positioning member 10 and the inner body member 12 and is slidable relative to the positioning member and the inner body member. The housing includes a first port 4 and a second port 6. Port 4 is connected to a pump which supplies pressurized fluid to the female portion 1' of the coupling. Port 6 is a vent passage. The inner body member includes a port 24 communicating with the first port 4 of the housing 1. The relief valve positioning member 10 includes a relief valve 7, a plug 22 and a spring 11 operating between the plug 22 and the relief valve 7. The plug 22 is press fit into the relief valve positioning member 10. A passageway (port) 4 through the inner body member 12 leads to a passageway 25 which leads around the female valve to the male valve. See, FIG. 1.

The piston 3 includes an interior 69, an exterior 70, and a passageway 21 interconnecting the interior 69 of the piston and the exterior 70 of the piston. The valve 2 sidably engages the piston and seats against the inner body member 12 when the coupling is disconnected. See FIG. 3. Spring 9 operates between the valve positioning member 10 and valve 2.

Figure 3:
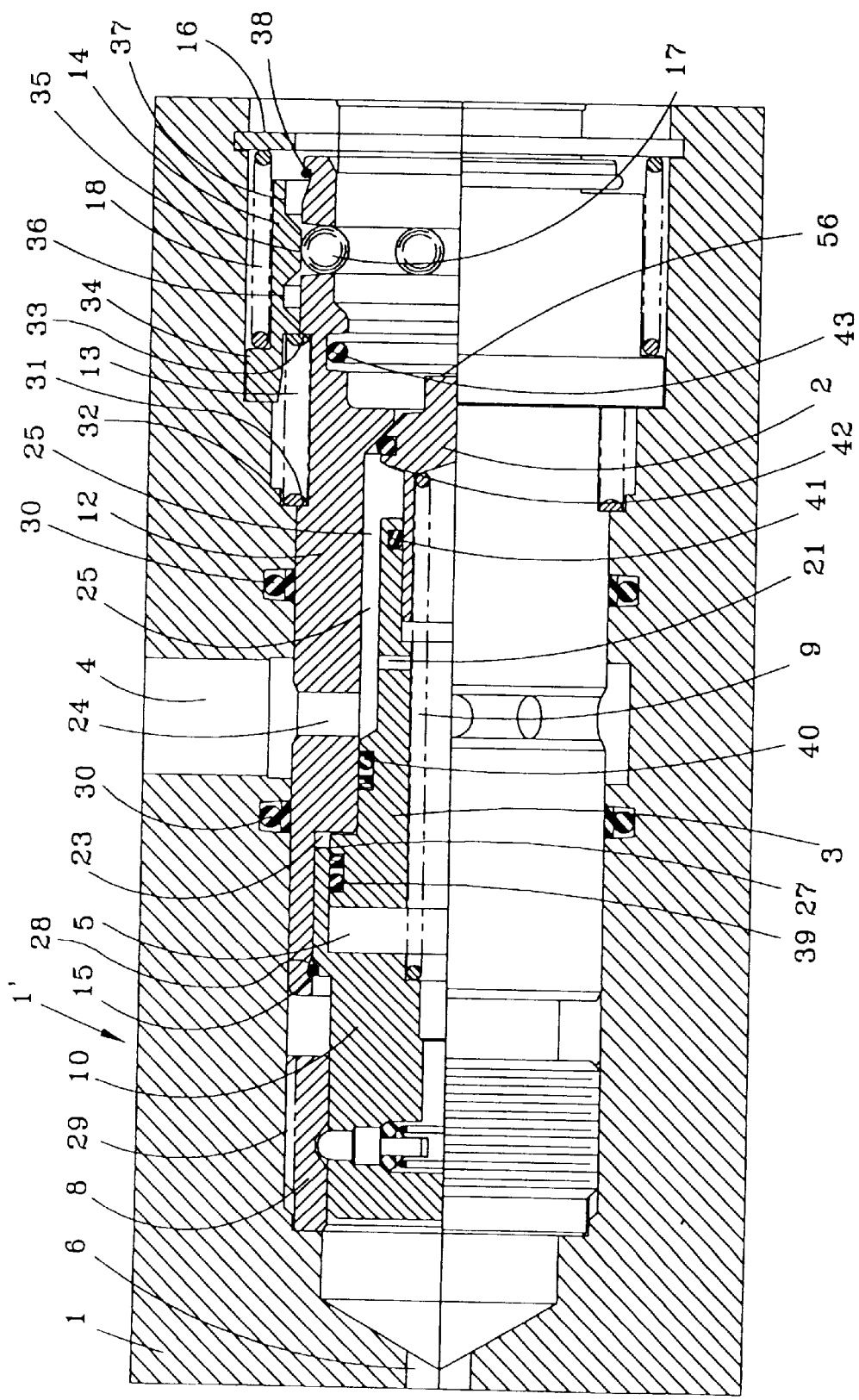
FIG. 3 is a partial cross-sectional view of the female half of the coupling in the uncoupled condition and with the female valve closed.

FIG. 3 is a partial cross-sectional view of the female half of the coupling in the uncoupled condition. FIG. 3 illustrates the female valve 2 seated against the inner member 12. Referring again to FIG. 1, the male portion 19' of the coupling engages the inner body 12 of the female portion 1'.

Figure 1A:
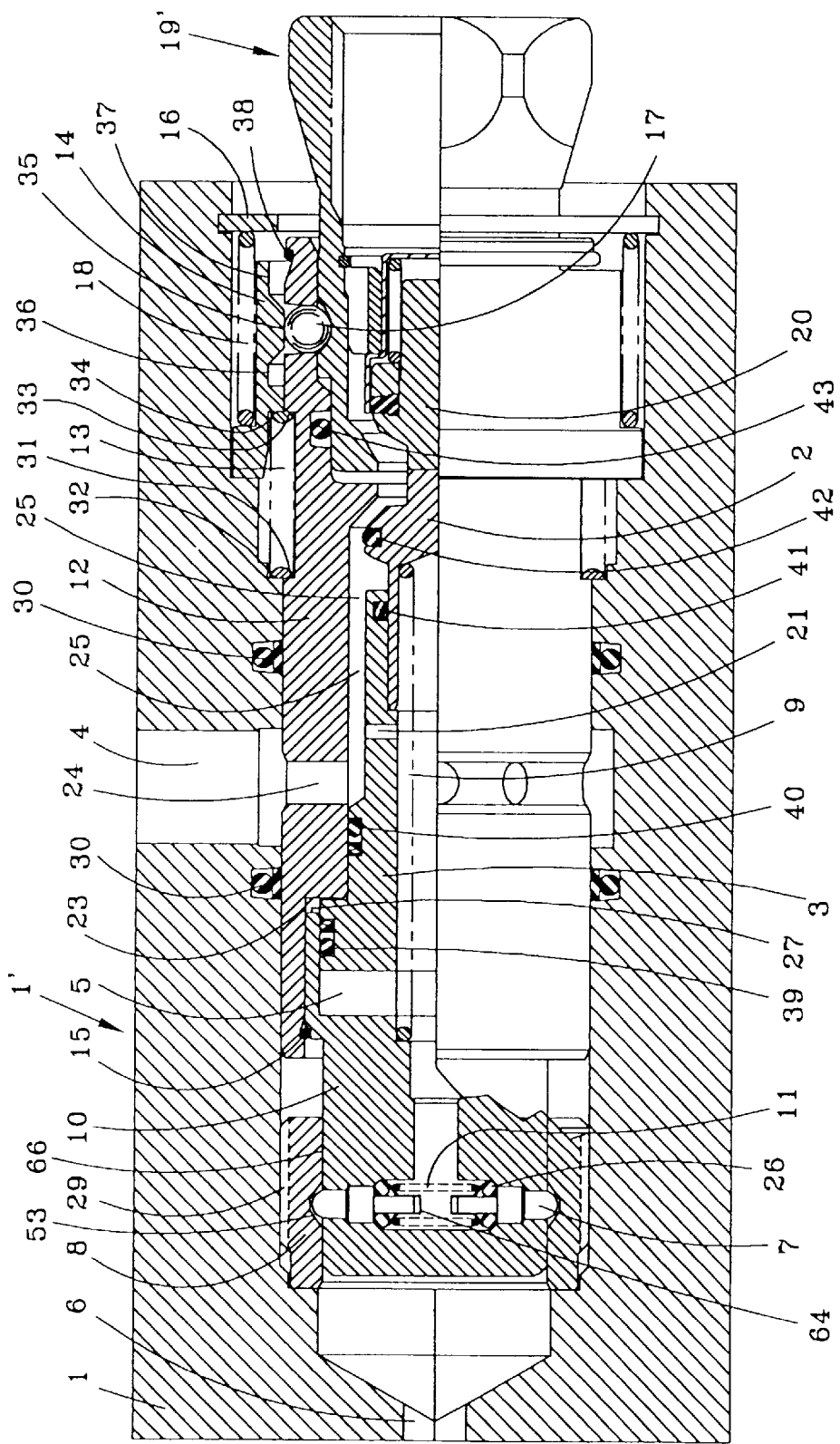
FIG. 1A is a view similar to that in FIG. 1 except that another embodiment employing two vent valves is illustrated.
Figure 2:
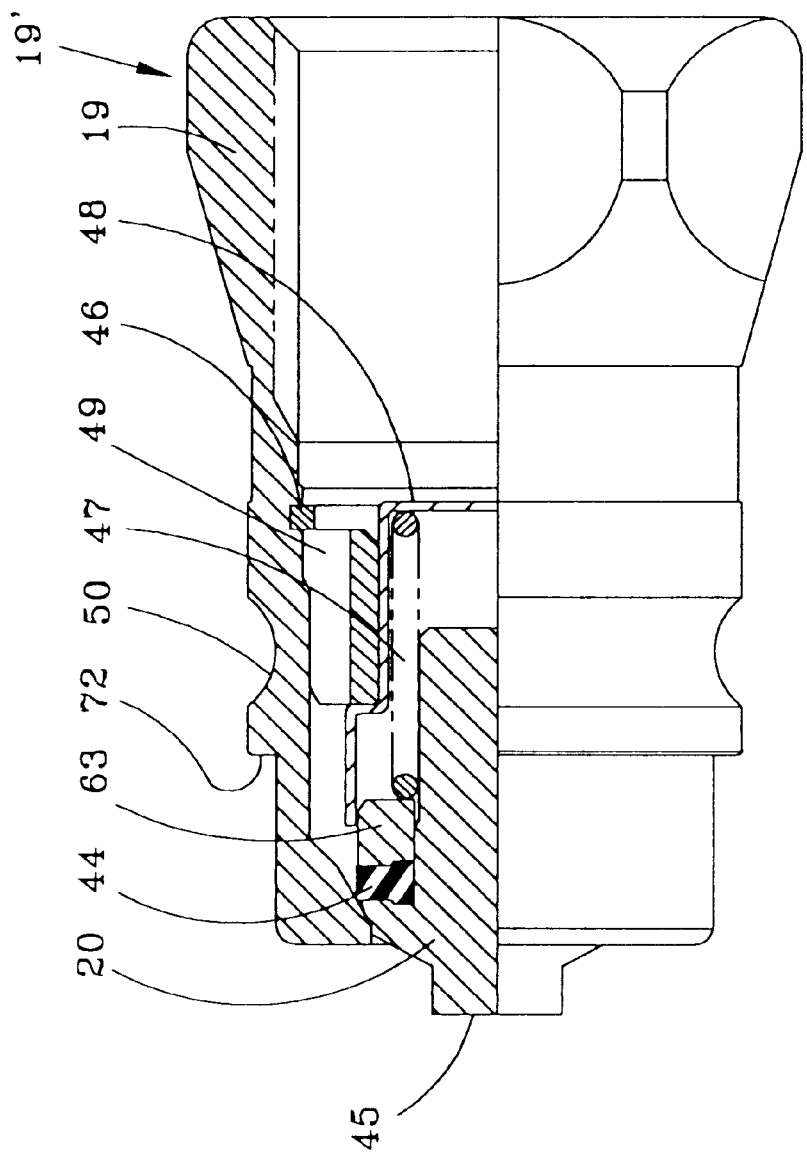
FIG. 2 is a cross-sectional view of the male half of the coupling.

FIG. 2 is a cross-sectional view of the male half 19' of the coupling. Male member 19' includes male body 19, male valve 20, seal 44, a seal retainer 63, a spring housing 48, and a spring housing support 49. Spring housing support 49 is press fitted into engagement with the spring housing 48. Spring housing 48 guides the male valve 20, seal retainer 63 and seal 44 when the male and female coupling halves are engaged. See FIGS. 1 and 1A. Spring 47 operates between the spring housing 48 and the seal retainer 63. Seal 44 seals against the body 19 of the male. Valve 20 includes face 45 for engagement with a corresponding face 56 of the female valve. Snap ring 46 holds the male member 19' assembly together. Male valve body 19 includes a recess 50 for cooperative locking action with detent members 17. Referring to FIGS. 1 and 1A, fluid flows past the support 49 as the supports 49 are spaced about the circumference of the spring housing 48.

Referring to FIG. 1, for instance, the inner body 12 of the female portion includes a chamber 5 formed by the relief valve positioning member 10 and the piston 3. When chamber 5 is pressurized, piston 3 is urged against inner body member 12 and valve positioning member 10 is urged into engagement with snap ring 15. When male member 19' enters the pressurized female member 1' during coupling, shoulder 72 on the male member urges detent members 17 and inner body member 12 leftwardly. Pressure in chamber 5 keeps the relief valve positioning member against snap ring 15 and the relief valve positioning member is also urged leftwardly as the inner body member is moved leftwardly. As the relief valve positioning member is urged and moves leftwardly, one or more vent valves 7 will follow the contour 66 of the sleeve 8 resulting in the depression of valve(s) 7 and venting the female member through the second port 6 of the housing 1 of the female member 1'. Once pressure is vented in the female, the valve 2 will open under the urging of the male valve 20 and the male body 19 proceeds further into the female. As this is occurring, detents 17 move outwardly into the first interior recess 36 in the locking sleeve. As the detents 17 move outwardly, the male body 19 moves still further into the female member under the urging of an external force, for instance, the operator's hand until recess 50 in the male body 19 resides in proximity (inwardly) to the detents allowing them to subsequently move inwardly when the operator releases the external force. Spring 13 returns the inner body member 12 rightwardly.

FIG. 1A is a view similar to that in FIG. 1. Two vent valves 7 are employed in the embodiment illustrated in FIG. 1A. Plug 22 is not used in FIG. 1A and instead two vent valves share a mutual spring 11 which resides between them. Both FIGS. 1 and 1A illustrate vent valves 7 sealing the interior of the female member 1'.

Figure 4:
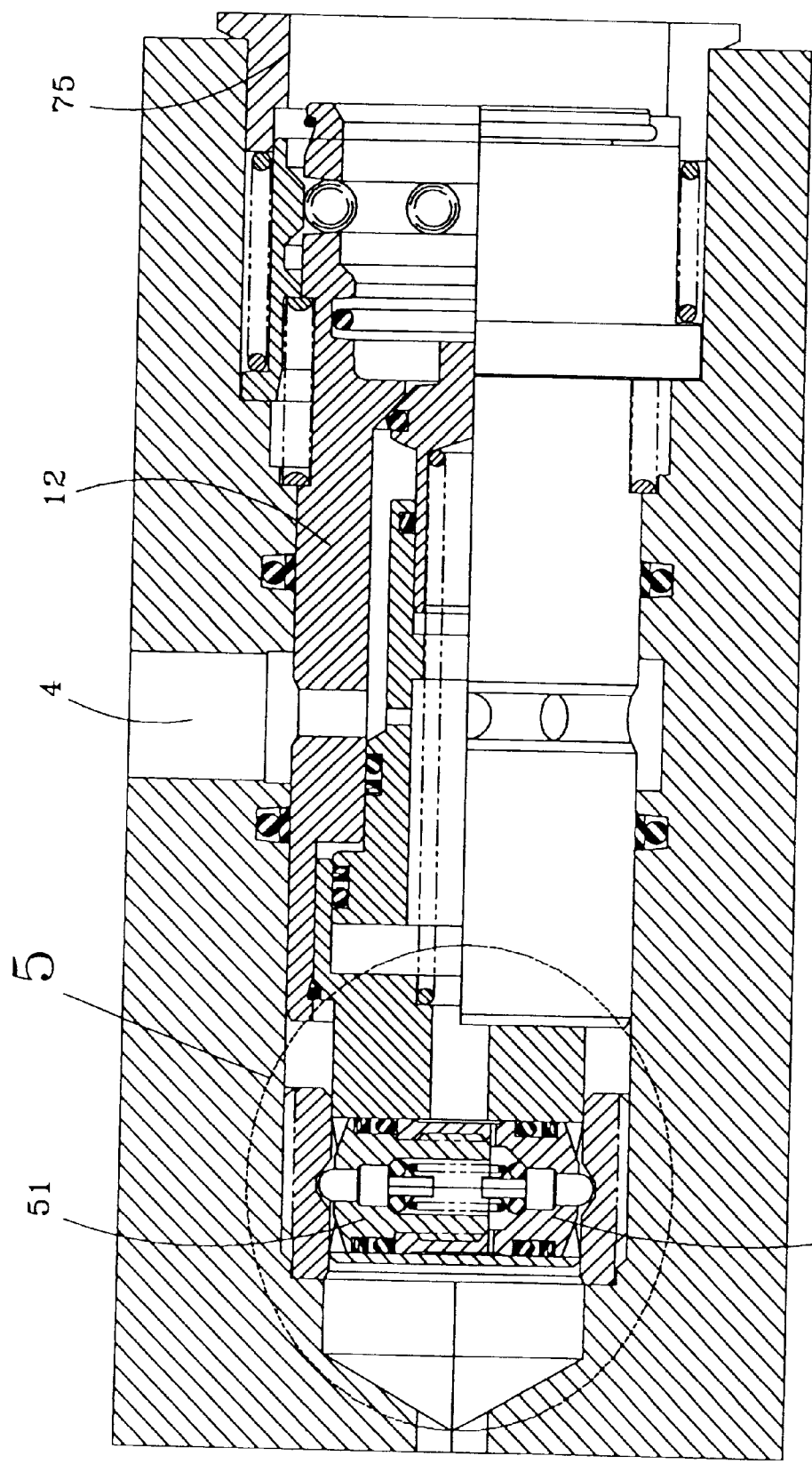
FIG. 4 is a partial cross-sectional view of the female half of the coupling illustrating, among other things, a relief valve positioning member having two relief valves and a two piece venting assembly.
Figure 5:
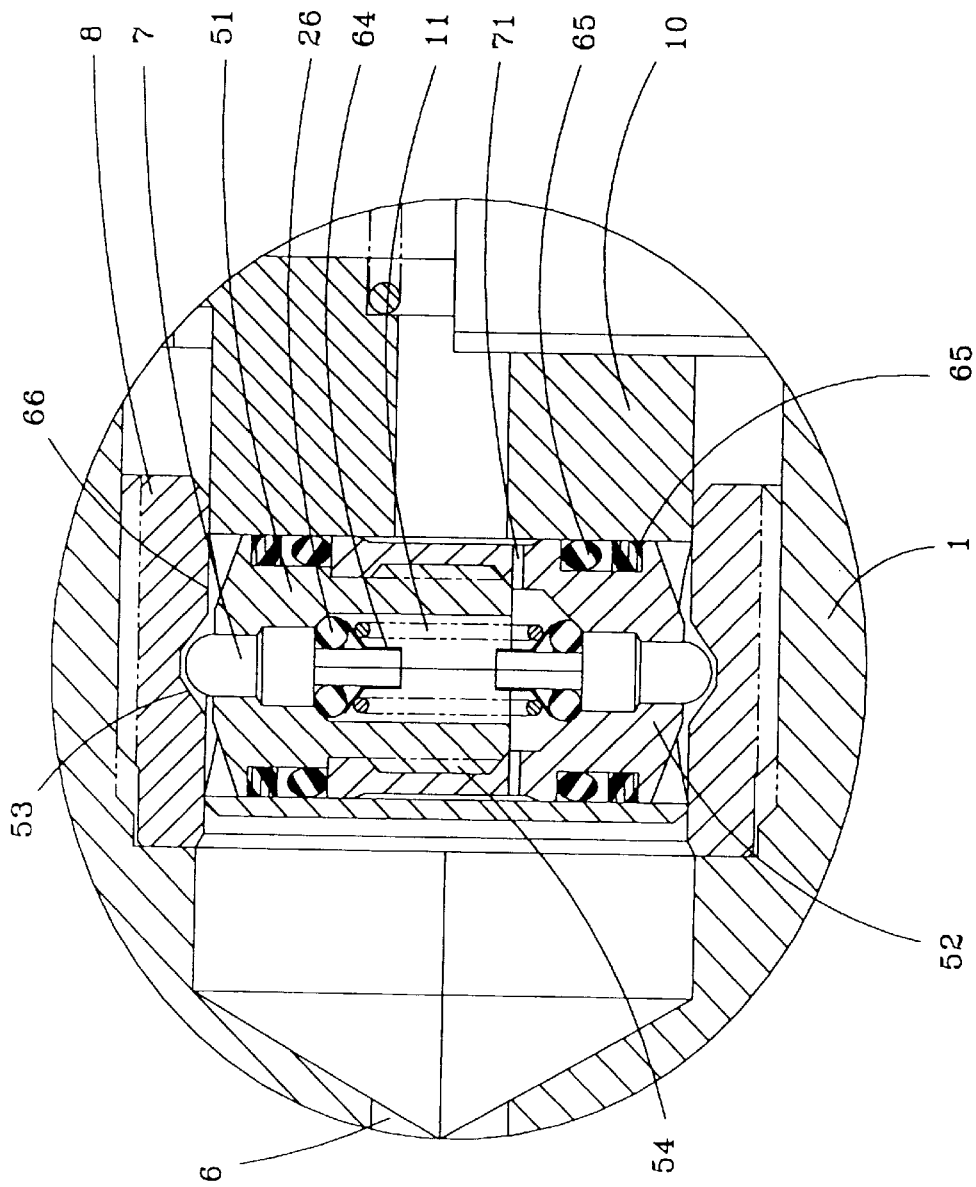
FIG. 5 is an enlargement of the threaded relief valve positioning member illustrated in FIG. 4.

FIG. 4 is a partial cross-sectional view of the female half 1' of the coupling illustrating, among other things, a relief valve positioning member having two relief (vent) valves 7 and a two piece venting assembly 51, 52. Referring to FIG. 5, reference numeral 54 represents a threaded interconnection for securing the two piece venting assembly 51, 52. The two piece venting assembly is cylindrically shaped and includes a passageway 71 for fluid flow into the assembly.

Referring to FIGS. 1, 1A, 3, 4, and 5 a threaded insert or sleeve 8 is secured to the bore of the housing 1. Reference numeral 29 represents the threaded interconnection between the sleeve 8 and the housing 1. Sleeve 8 includes circumferential recess 53. It will be understood by those skilled in the art that the housing or body 1 of the female portion 1' of the coupling may assume just about any shape that may convenient for application (for example, mounting) of the invention. Further, it will be understood by those skilled in the art that the body 1 will include a stepped bore of varying diameters along its axial length. Similarly it will be understood by those skilled in the art that the inner body member 12, piston 3, and valve 2 are generally cylindrically shaped.

When the relief valve positioning member 10 is positioned as illustrated in FIGS. 1, 1A, 3, 4, and 5 the valve or valves 7 as the case may be, are allowed to protrude away from the axis of the coupling and to seal the interior of the coupling. Referring to FIGS. 4 and 5, seals 26 prevent fluid from escaping along vent valves 7 and along the interface of the relief valve positioning member 10 and the annular sleeve 8. Reference numeral 64 refers to a bracket which performs the dual function of acting as a spring brace and as a seal retainer. A plurality of seals 65 are used to seal the two piece venting assembly 51, 52 illustrated in FIGS. 4 and 5.

Figure 6:
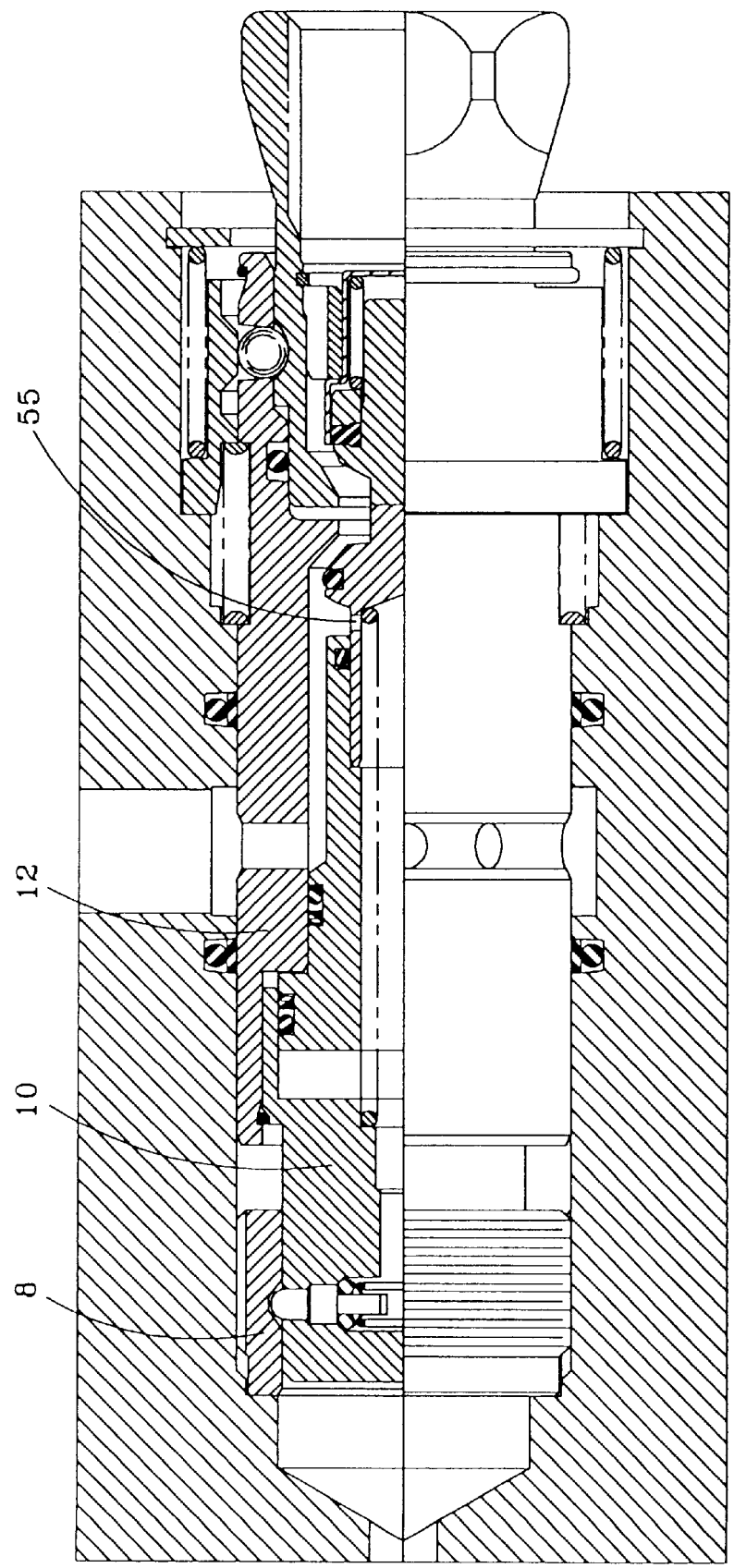
FIG. 6 is a partial cross-sectional view of the male and female halves of the coupling in the coupled condition similar to FIG. 1 except the passageway interconnecting the inlet port to the interior of the female half of the coupling is in the valve instead of the piston.

FIG. 6 is a partial cross-sectional view of the male and female halves of the coupling in the coupled condition similar to FIG. 1 except the passageway 55 interconnecting the inlet port 4 to the interior of the female half of the coupling is in the valve instead of the piston. The passageway 55 is located in the female valve 2 such that it always communicates to the interior of the valve 2 despite its relative position with respect to the piston 3. In other words, the piston 3 never covers up and blocks the flow of fluid through the passageway 55.

Figure 7:
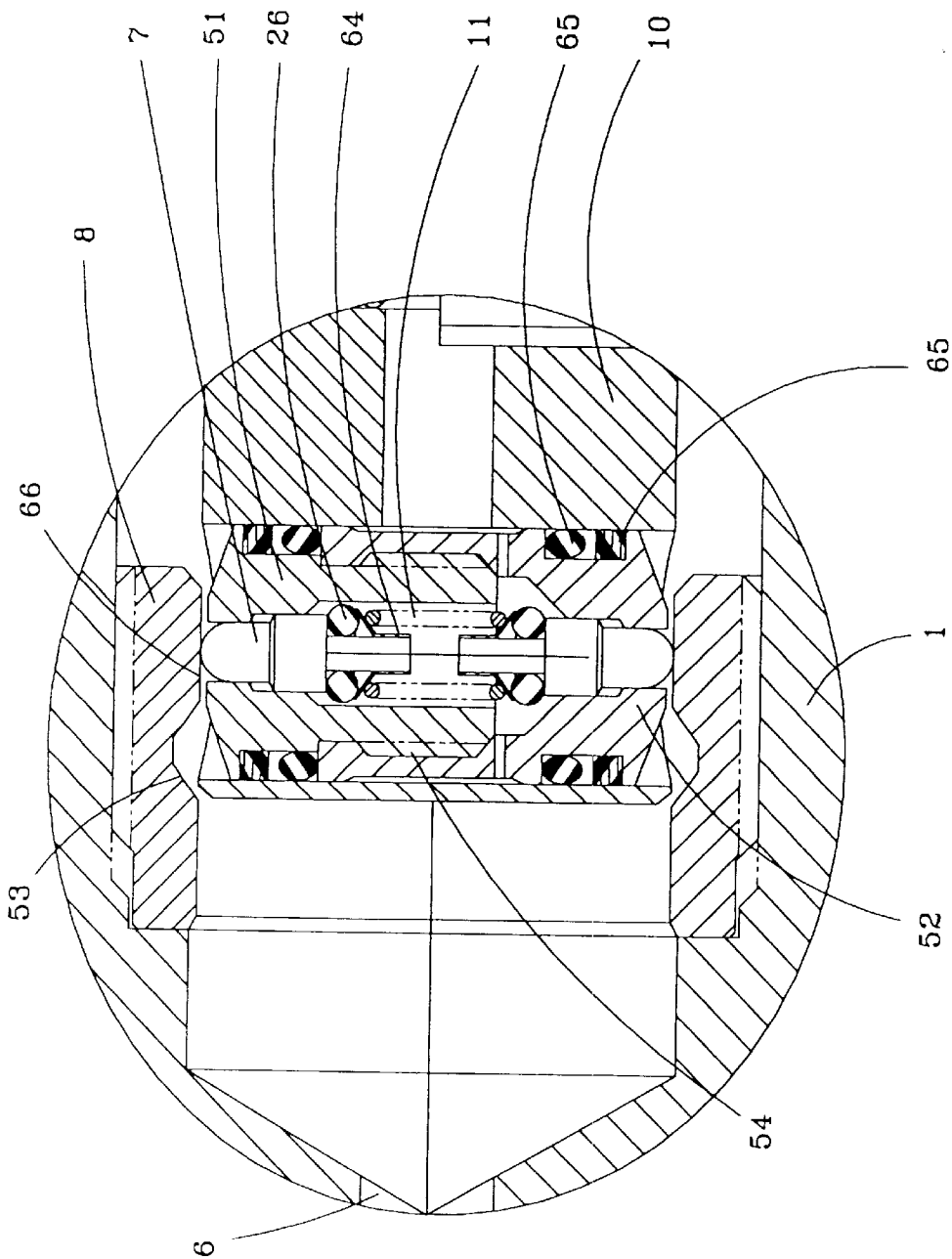
FIG. 7 is a view similar to FIG. 5 illustrating the vent valves off-center and to the right.

FIG. 7 is a view similar to FIG. 5 illustrating the vent valves off-center and to the right. This condition occurs when the male portion 19' is in the process of being uncoupled from the female portion 1' of the coupling. Referring to FIG. 1, for example, as the male portion 19' of the coupling is in the process of being withdrawn from the female portion of the coupling, the recess 50 in the male coupling is engaging the detents 17 in the inner body member 12 of the female portion of the coupling. As male portion 19' is pulled rightwardly, inner body member 12 of the female member also moves rightwardly. The inner body member 12 includes an annular snap ring 15 which resides in a groove 28 in the interior of the inner body member 12. Snap ring 15 engages the relief valve positioning member 10 and urges it rightwardly when viewing FIG. 1, for example. As relief valve positioning member is urged rightwardly, valve 7 (or valves 7 the embodiments employed in FIGS. 1A or 4 are under consideration) follows the contour 66 of sleeve 8 causing the valve(s) to be depressed inwardly toward the axis of the coupling. As valves 7 are depressed inwardly, fluid within the coupling escapes past seals 26 and along the interface between positioning member 10 and sleeve 8. Locking sleeve 14 of the female portion compresses spring 18 which resides between a shoulder on the locking sleeve 14 and washer 16.

Referring again to FIG. 1, for example, as male portion 19' is pulled rightwardly by an external source (by hand, for example), spring 13 acting between the first interior shoulder 32 of female housing 1 and first exterior shoulder 31 of inner body member 12 on the one side and interior shoulder 34 of locking sleeve 14 and second exterior shoulder of inner body 12 on the other side urges locking sleeve 14 (which is in functional engagement with the plurality of detent members 17 (balls 17)) rightwardly until the external extraction force overcomes the friction between the detents and the locking sleeve. Additionally, locking sleeve 14 may engage washer 16 (FIG. 1) or fitting 75 (FIG. 4).

Land 35 on the locking sleeve is in frictional engagement with the detent members 17 in the coupled condition and during a portion of the time during the uncoupling process. Additionally, land 35 of the locking sleeve 14 is in frictional engagement with the detent members 17 when the coupling is uncoupled (FIG. 3) and during a portion of the time when the coupling is in the process of being coupled.

After, the external extraction force overcomes the friction between the detents and the locking sleeve, the detents then are free to move outwardly into the second interior recess 37 of the locking sleeve 14. Spring 13 is then compressed by the locking sleeve 14 in combination with spring 18.

Those skilled in the art will recognize that snap ring 38 resides in an external groove in the inner body member 12 of the female member and serves to prohibit the movement of the locking sleeve therebeyond.

A plurality of seals are used in the instant invention. Elastomeric seal 39 prohibits fluid passage between piston 3 and positioning member 10. Elastomeric seal 40 prohibits fluid passage between piston 3 and inner body member 12. Elastomeric seal 41 prohibits fluid passage piston 3 and female valve 2. Elastomeric seal 42 prohibits fluid passage between inner body 12 and female valve 2. And, elastomeric seal 43 seals between the male member 19' and the inner body member 12 of the female member 1'. Elastomeric seals 30 seal ports 4 and 24. See, FIG. 1.

Figure 8:
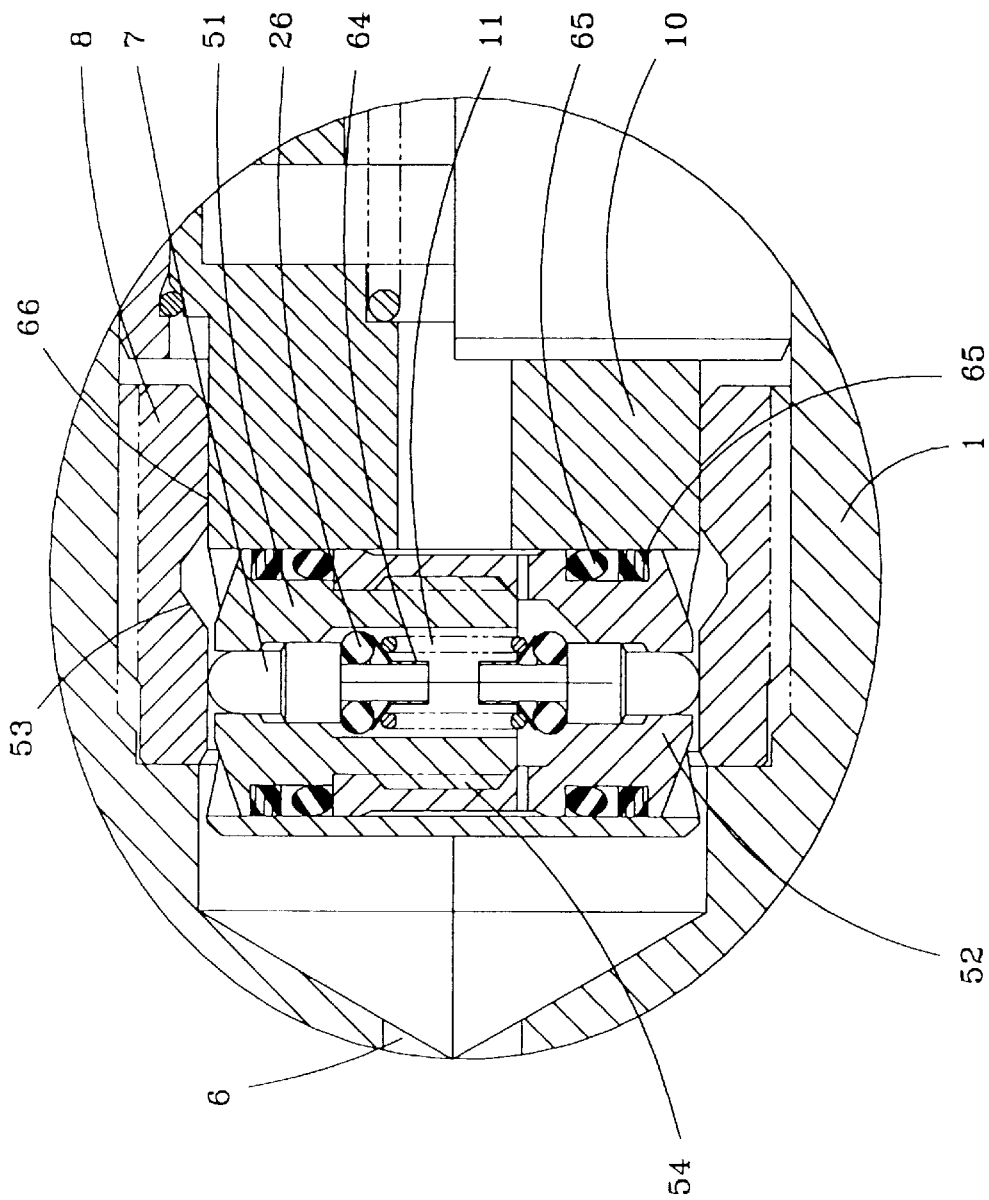
FIG. 8 is a view similar to FIG. 5 illustrating the vent valves off-center and to the left.

FIG. 8 is a view similar to FIG. 5 illustrating the vent valves off-center and to the left. This situation will occur during coupling of the male and female halves of the coupling together. Referring to FIG. 3, for example, the detent members are initially under land 35. As male member 19' enters and moves the inner body member 12 leftwardly, pressurized chamber 5 maintains relief valve positioning member 10 against snap ring 15 and positioning member 10 is urged leftwardly. Valve 7 follows the contour 66 of the sleeve 8 which urges valve 7 inwardly compressing spring 11. Fluid within the female valve then escapes around seals 26.

Figure 9:
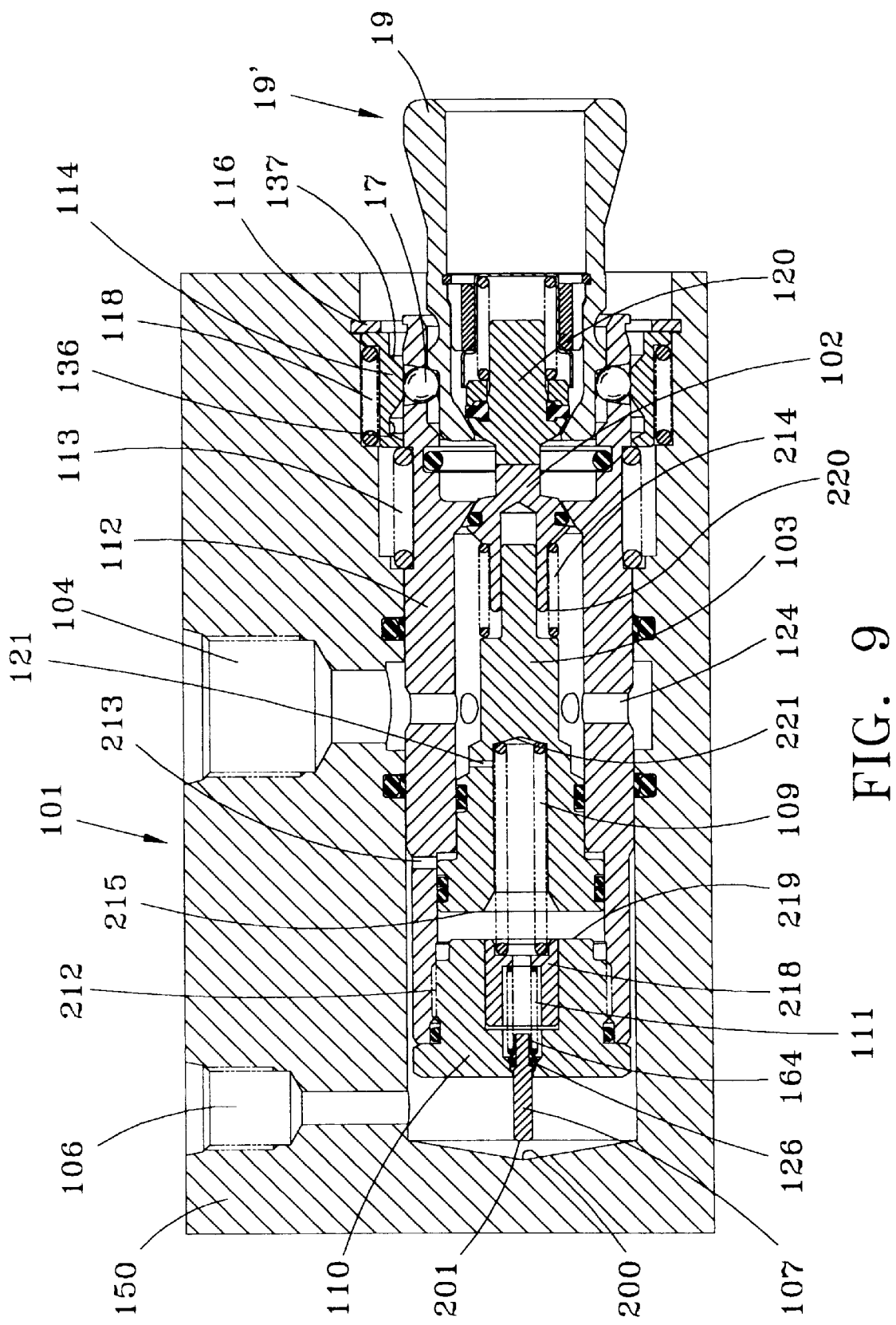
FIG. 9–16 and 20 are views of another embodiment of the coupling.

FIGS. 9–16 and 20 are views of another embodiment of the coupling. FIG. 9 is a cross-sectional view of the invention illustrating the male half of the coupling just beginning to enter the female half of the coupling. The male half of the coupling is designated by reference numeral 19'. Female half 101 includes a female valve 102, a piston 103, an inlet port 104, and a vent 106. Hydraulic fluid is supplied under pressure to inlet 104. Inner body member 112 is movable within body member 150. The relief valve positioning member 110 is affixed to the inner body member 112 by means of a threaded interconnection 212. Vent valve 107 is housed within the relief valve positioning member 110. Sometimes herein the relief valve positioning member 110 is referred to as the vent mechanism. A spring support 218 supports spring 111 which is operable between the spring support 218 and the brace 164. The brace 164 is similar to the brace 64 referred to previously herein. The brace 164 serves to retain seals 126 between the brace 164 and the vent valve 107.

Spring support 218 also serves to support spring 109 which is operable between piston 103 and said spring support or spacer 218.

Referring still to FIG. 9, end 201 of vent valve 107 engages surface 200 of body 150 when the relief valve positioning member 110 moves leftwardly. Piston 103 includes a surface 215 and a surface 221. These surfaces experience the pressure in the chamber defined by surfaces 215 and 221 together with the surface 219 of the relief valve positioning member 110. In actuality, spring support 218 also has a surface exposed to pressure and vent valve 107 has a small surface area exposed to pressure within the chamber generally defined by surface 215, 221 and 219. Inner body member 112 includes ports 124 which allow flow from the inlet 104 through the coupling when it is fully coupled. Passageway 121 connects the exterior of the piston 103 with the interior of the piston 103 and the chamber as previously defined. When this chamber (and the pressure source coming from inlet 104) is vented, coupling of the male and female halves together is facilitated.

Referring still to FIG. 9 spring 214 is operable between female valve 102 and piston 103. Female valve 102 includes an end portion 220 which abuts up against piston 103 in certain circumstances. See, for example, FIG. 10.

Referring again to FIG. 9, spring 113 is operable between body 150, inner body member 112, and locking sleeve 114. Spring 118 is operable between locking sleeve 114 and body 150. Washer 16 limits the rightward movement or travel of locking sleeve 114. FIG. 9 also illustrates the male valve 120 engaging the female valve 102.

Referring still to FIG. 9, locking sleeve 114 includes first interior recess 136. Reference numeral 137 denotes the second interior recess on locking sleeve 114.

Figure 16:
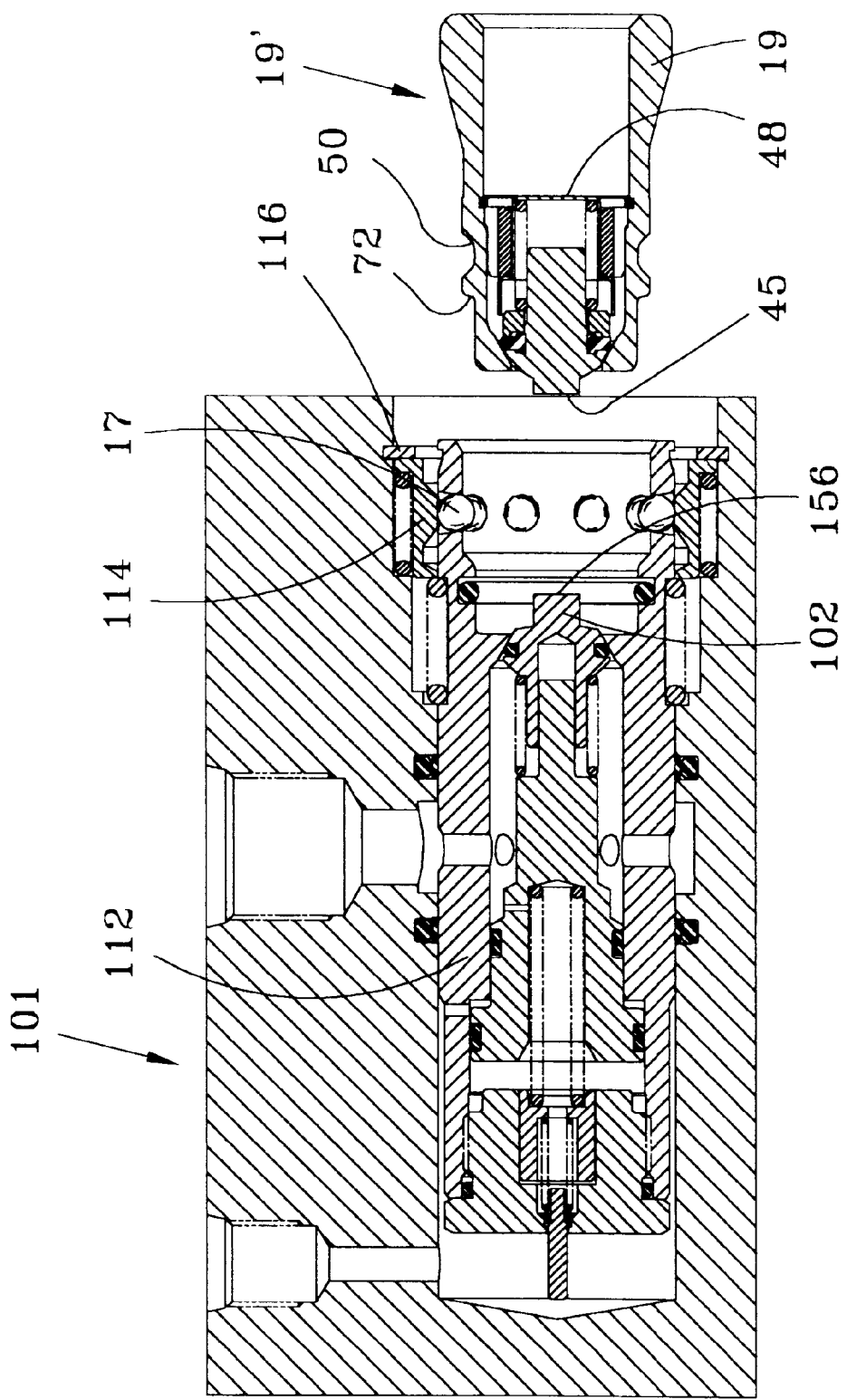

Referring to FIG. 16, a cross-sectional view of the coupling in the uncoupled condition, reference numeral 45 refers to the face of the male valve 120. Similarly, female valve 102 includes a face 156.

Figure 10:
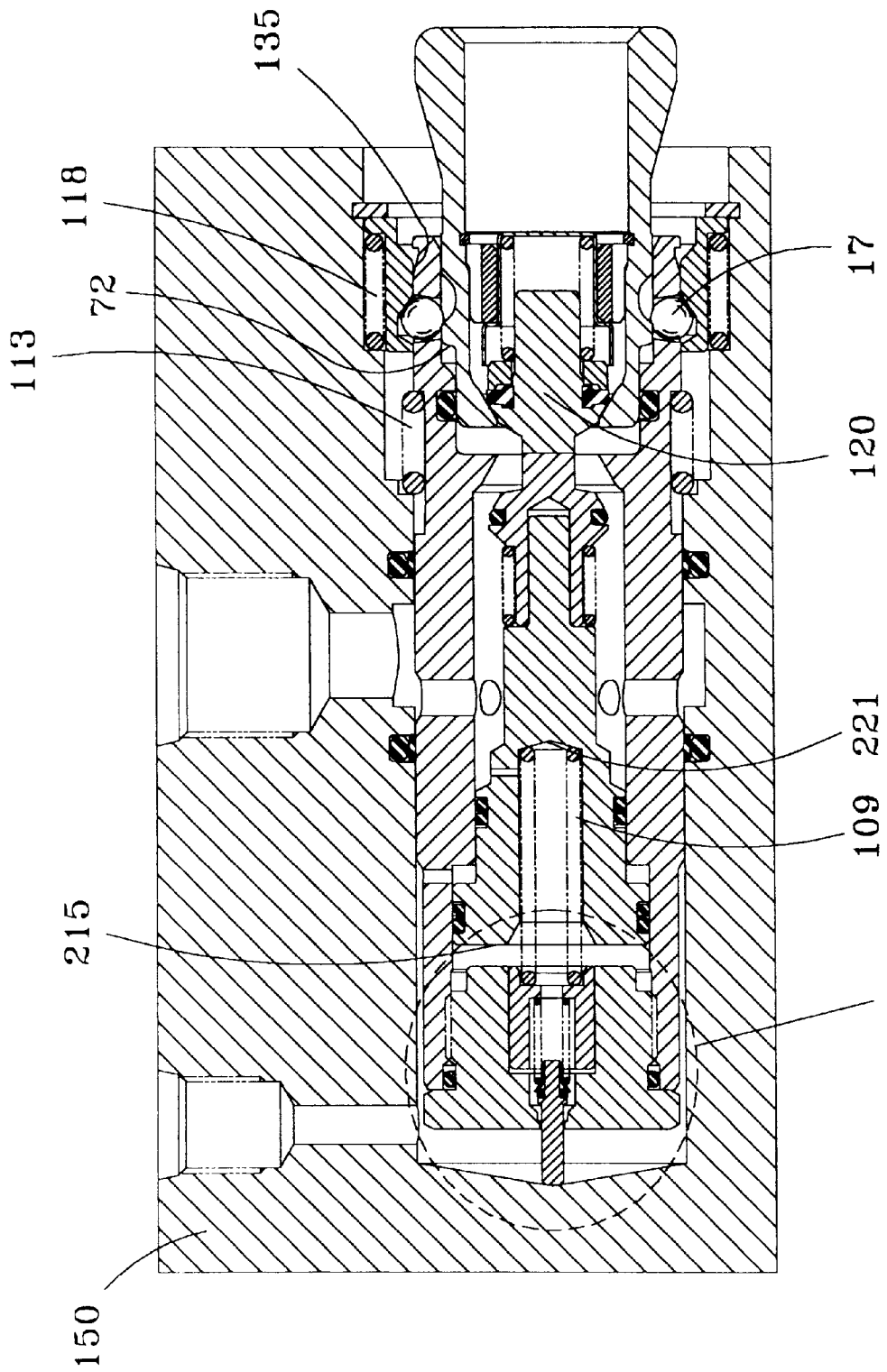
Figure 20:
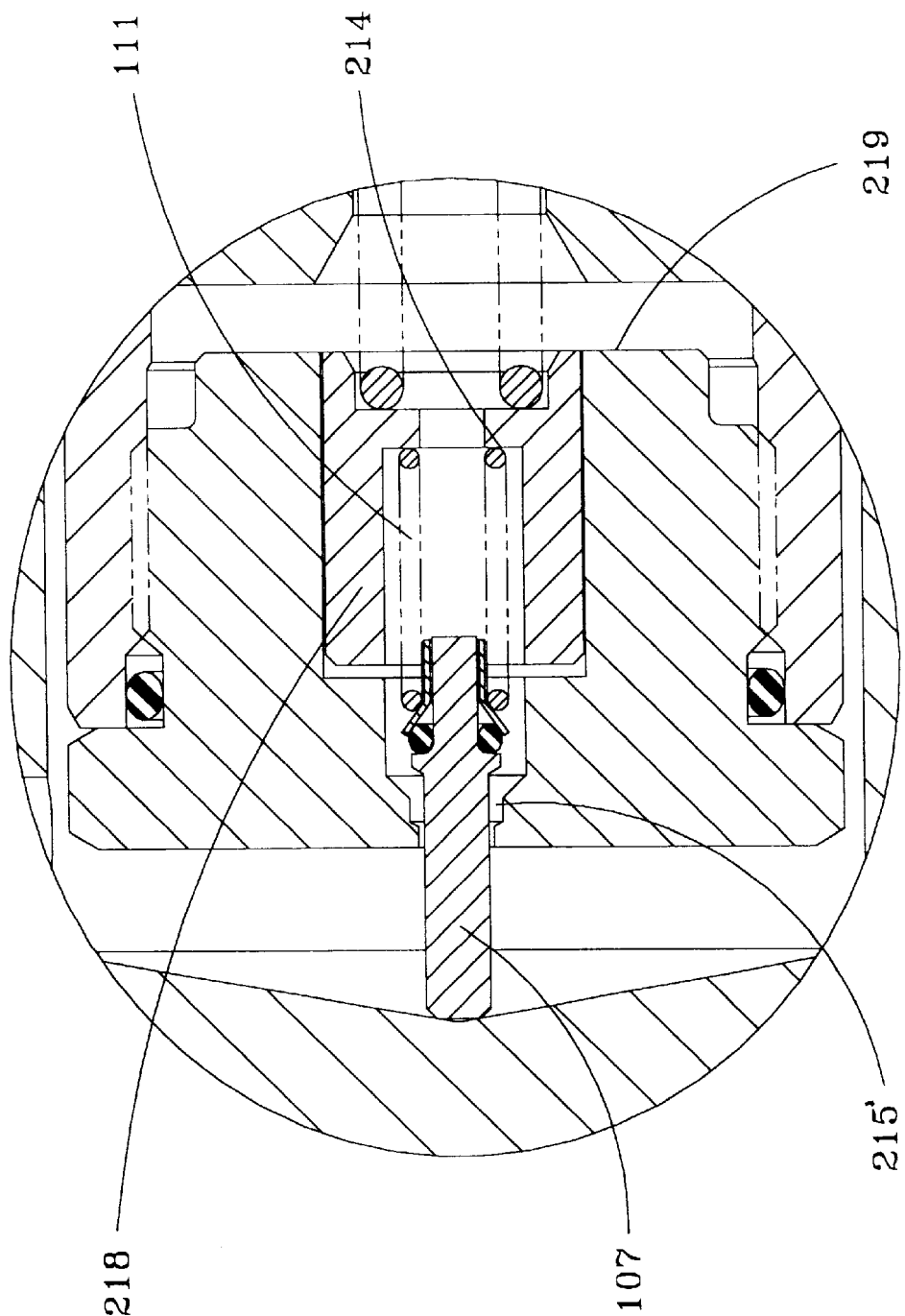

FIG. 10 is a cross-sectional view illustrating the male half of the coupling engaging the female half and urging the inner body member 112 leftwardly venting the female half 101 of the coupling by way of vent 106. The large numeral 20 indicates an area defined by dash lines which make up FIG. 20 which will be discussed hereinbelow. In FIG. 10, it is illustrated that the locking balls 17 have been forced up into the first interior recess 136 of the locking sleeve 114. Reference numerals 136 and 114 appear on FIG. 9 but do not appear on FIG. 10 for the sake of clarity. FIG. 10 illustrates the vent valve 107 engaging the body 150. This creates a passageway 215' by which fluid can flow from the interior of the female valve to the vent 106. Referring to FIG. 20, it is an enlarged view of the venting mechanism illustrated in FIGS. 9–16 hereof FIG. 20 is shown in the venting condition, namely, reference numeral 215' denotes a passageway by which fluid can flow from the interior of the coupling, namely, the chamber generally formed by the piston 103 and the relief valve venting mechanism 110.

Figure 11:
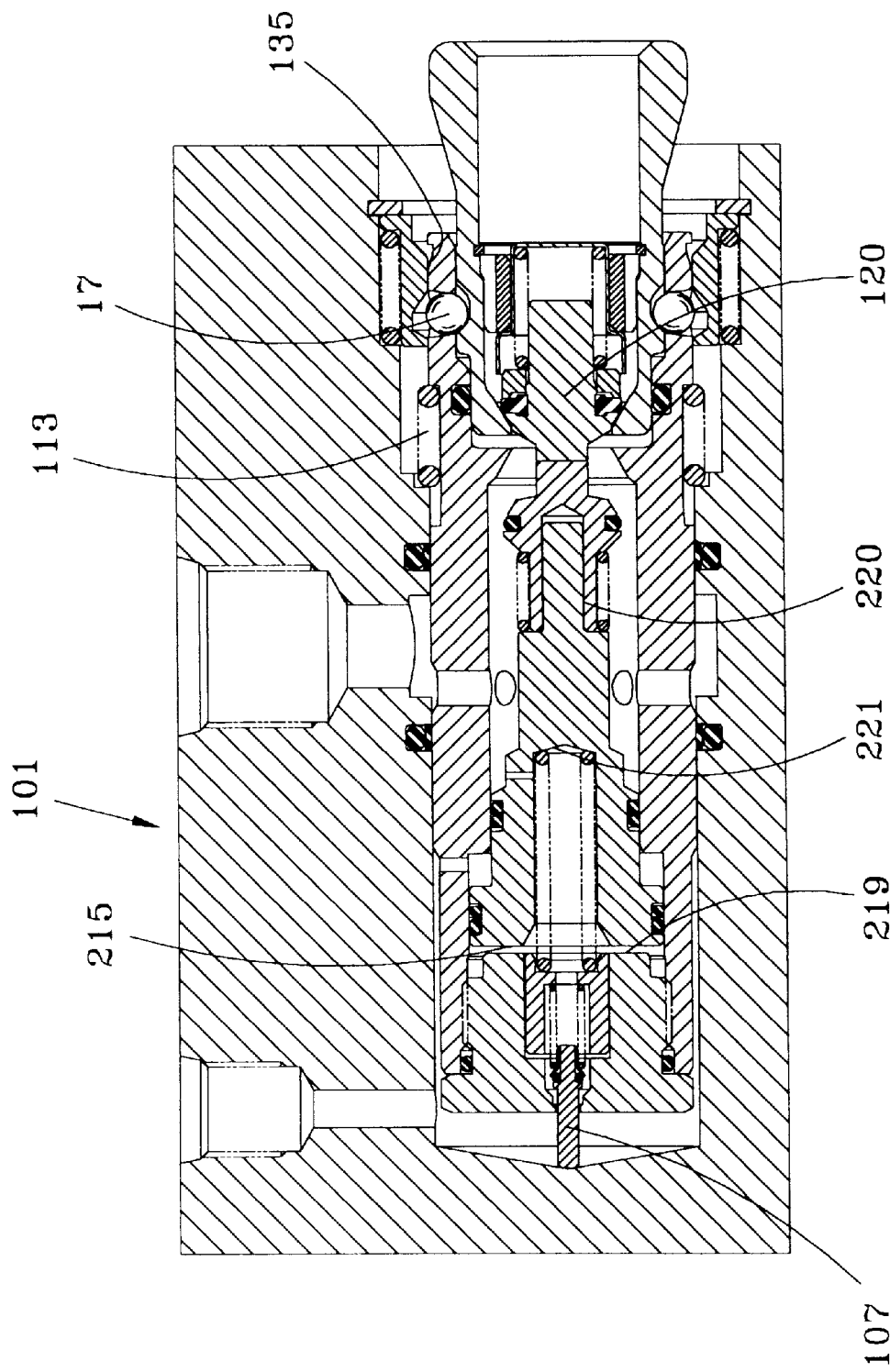

FIG. 11 illustrates the male half progressing further leftwardly. As the male half moves leftwardly the chamber generally defined by the surfaces 215 and 219 is decreasing in size due to the venting of the female half of the coupling.

Figure 12:
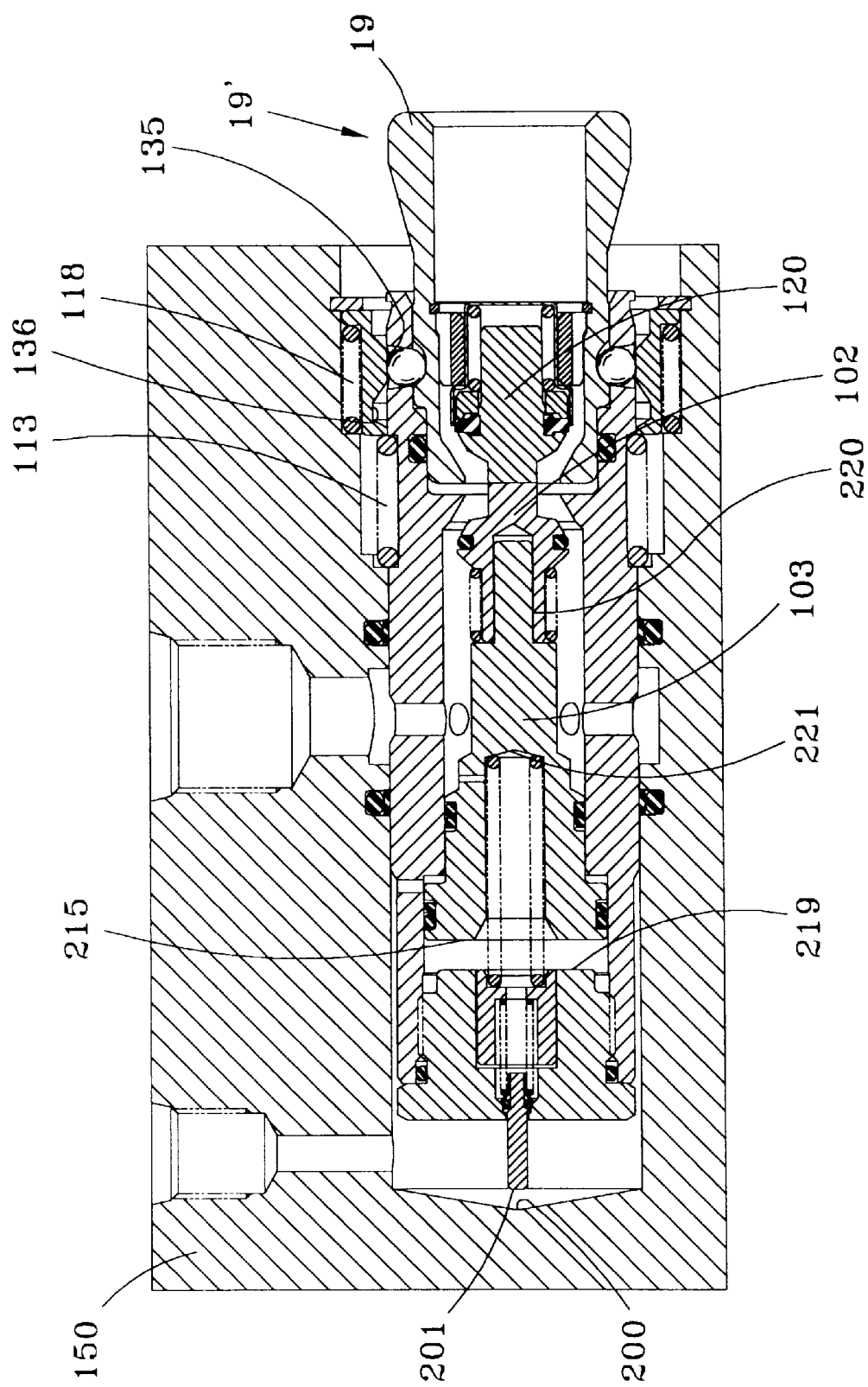

FIG. 12 is a cross-sectional view of a coupling filly engaged with the male and female valves 120 and 102, respectively, open. At this point in time the operator of the coupling would have released the pressure that he or she was applying to the male half of the coupling during the connection process.

FIGS. 9–16 and 20 illustrate a push to connect and a push to disconnect coupling. The force behind the coupling action is generated by a person's hand causing the male half to be inserted into the female half and to urge the male half of the coupling leftwardly.

It will be noticed in FIG. 11 that balls 17 are shown engaging the recess 50 of the male half of the coupling. It will be understood by those skilled in the art that one of those balls, depending on the orientation of the coupling may actually be up against the first interior recess 136 of the sleeve 114. This would depend on the orientation of the coupling with respect to the earth.

Referring again to FIG. 12, it will be noticed that the chamber which is generally defined by the surfaces 219, 221 and 215 is illustrated as a relatively large volume.

Figure 13:
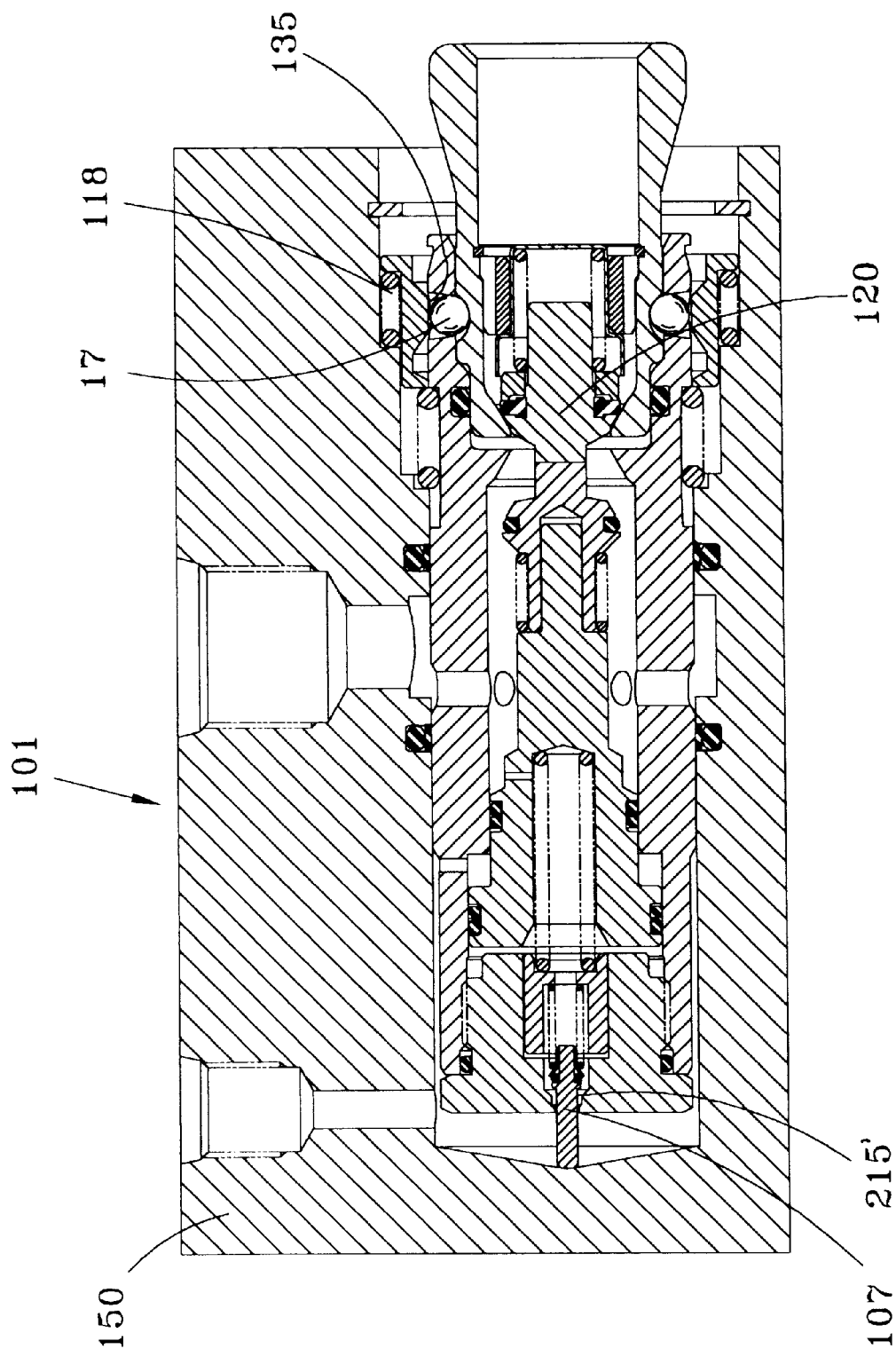

FIG. 13 is a cross-sectional view of the coupling in the process of being uncoupled. This occurs when the male half 19' of the coupling is urged leftwardly to vent the female half of the coupling. It will be noticed in FIG. 13 that the spring 118 is compressed. Spring 118 is operable between the sleeve 114 and the body 150. When the operator wishes to disconnect the male and the female halves of the coupling from each other, he or she simply pushes the coupling leftwardly which urges the inner body member 112 and the relief valve venting mechanism 110 leftwardly which causes valve 107 to open. Passageway 215' then vents the interior of the coupling. As the female half of the coupling is vented as shown in FIG. 13, this enables the male valve 120 to close against its seat. Once the female half of the valve is vented and the male valve 120 is closed, which happens very quickly, the operator then begins to withdraw (i.e., move rightwardly) the male half of the coupling from the female half of the coupling (see FIG. 14).

Figure 14:
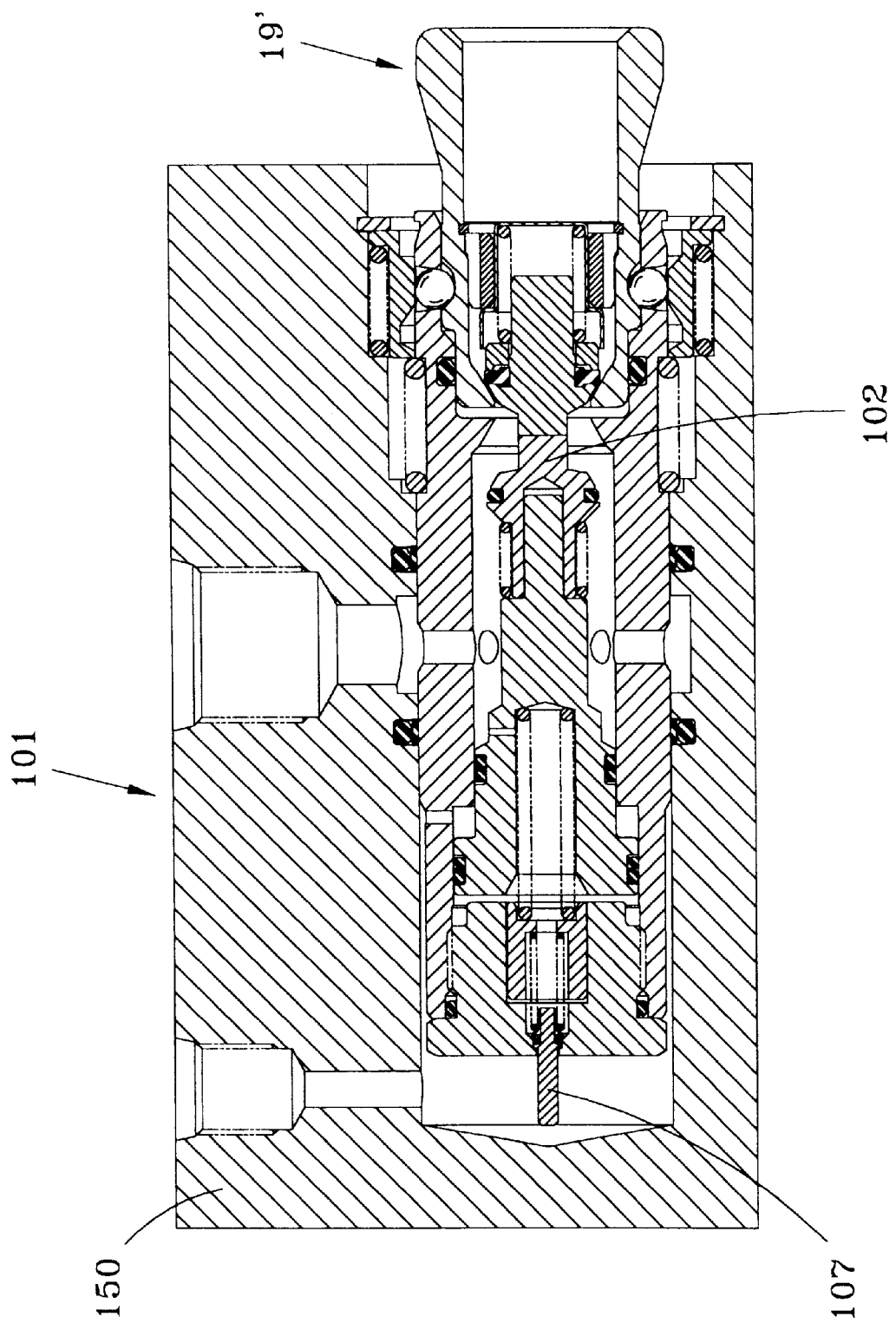

FIG. 14 is a cross-sectional view of the coupling after the female half has been depressurized. FIG. 14 illustrates the male half of the coupling 19' being further withdrawn from the female half of the coupling.

Figure 15:
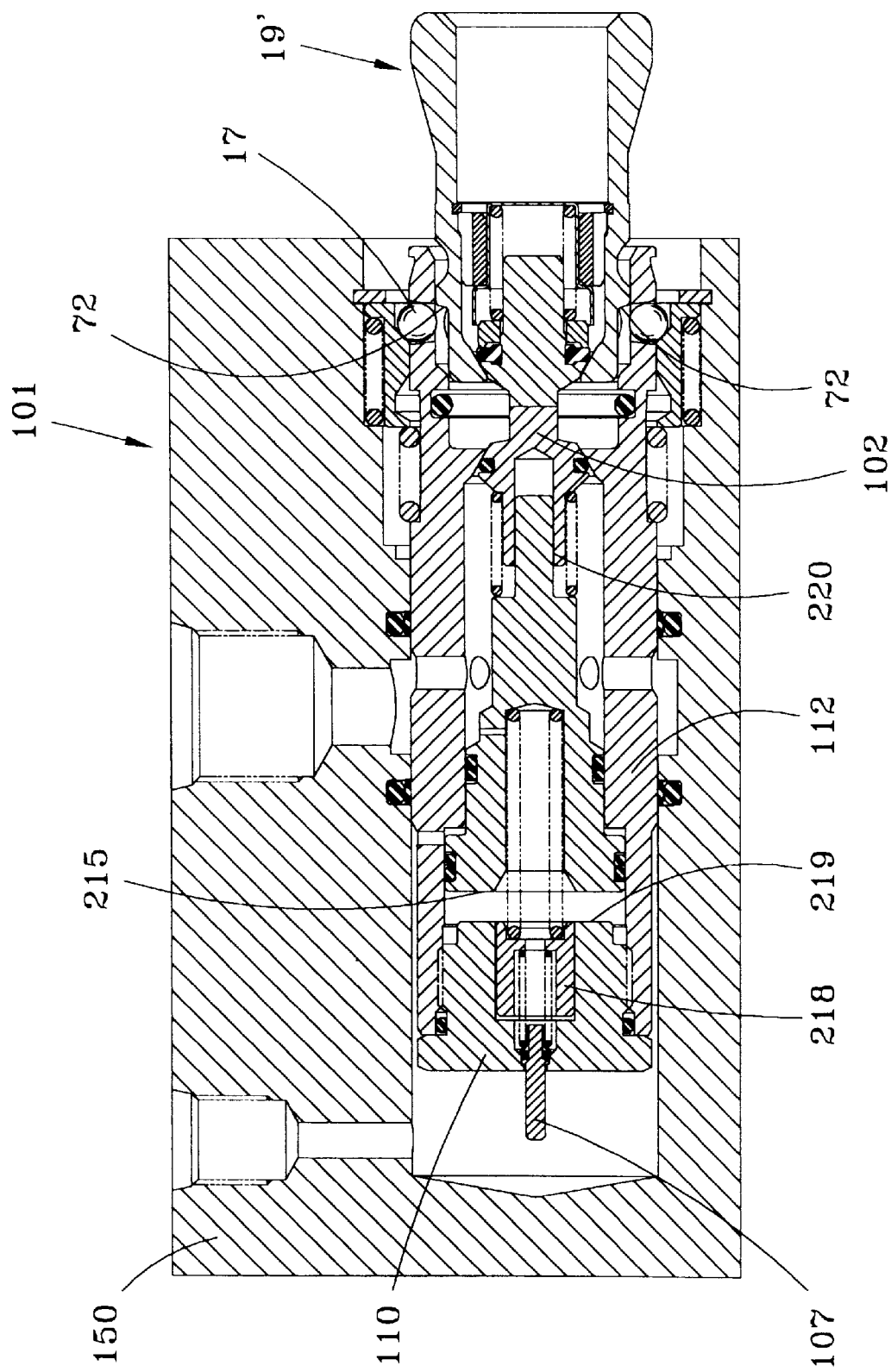

FIG. 15 is a cross-sectional view of the coupling illustrating rightwardly movement of the inner body member 112 of the female half 101 during the uncoupling process. FIG. 15 illustrates the female valve 102 in its closed position. FIG. 15 also illustrates balls 17 or detent members 17 in the second interior recess 137 of the locking sleeve 114. Again the second interior recess 137 is best seen in FIG. 9.

Figure 17:
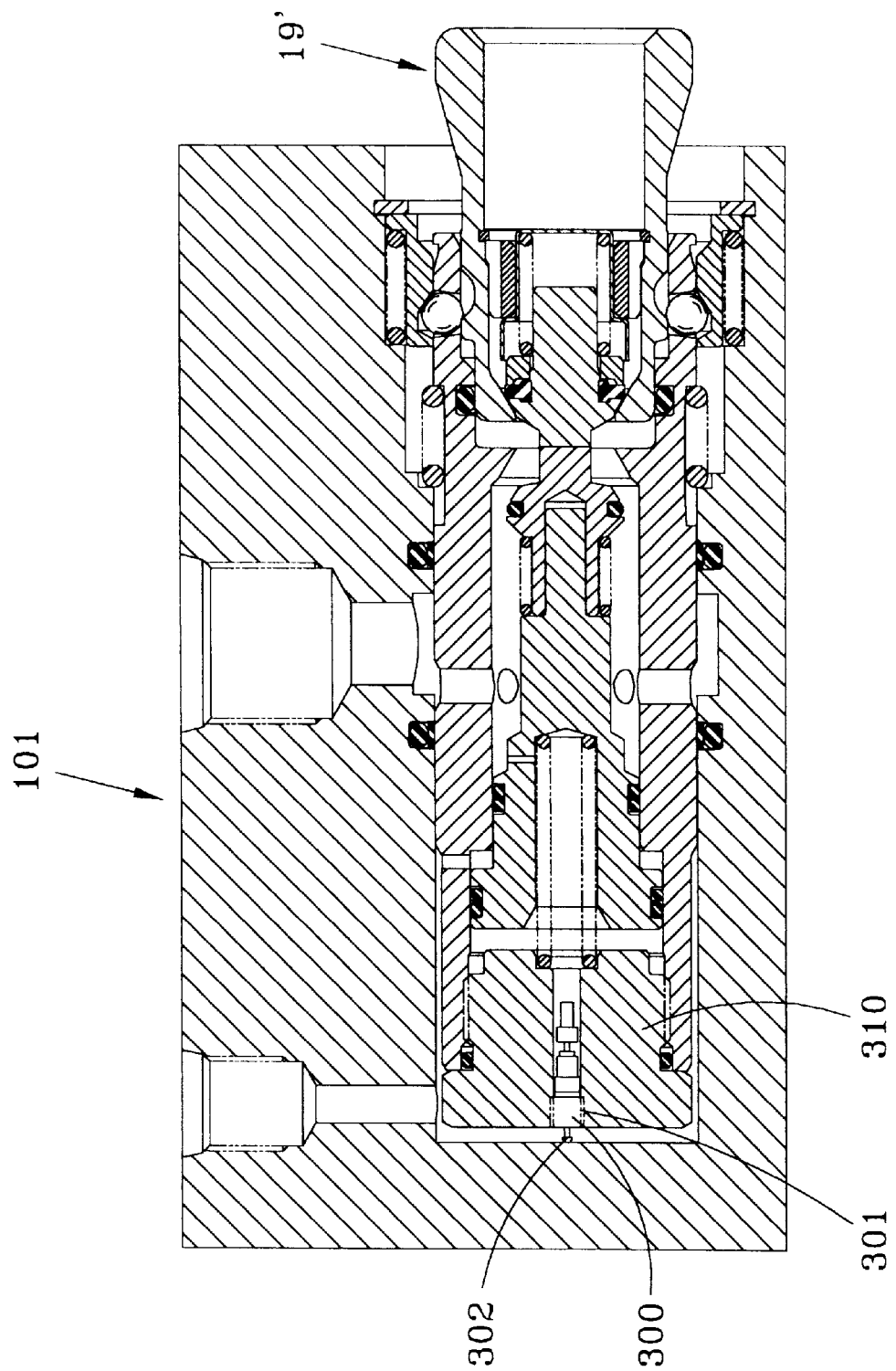
FIG. 17 is a cross-sectional view of the coupling illustrating the use of the tire valve to bleed pressure from within the female half of the coupling.

FIG. 17 is a cross-sectional view of the coupling illustrating the use of a tire valve 300 to bleed pressure (vent) from within the female half of the coupling. Tire valve 300 includes a needle valve 302. Tire valve 300 is affixed to the relief valve positioning member 310 by means of a threaded inner connection 301. It will be noticed that the geometry of the body of the female half of the coupling 101 in this instance is slightly different in that the concavity on the leftward portion of the bore of the female half is missing. Namely, a flat surface is desirable for operating the needle valve 302. When the concavity is small, the needle valve would also be operable. FIG. 17 merely shows the preferred method or the preferred structure. It will be noticed that in FIG. 17 no spring support is used. It will also be noticed in FIG. 17 that one fewer spring is also needed.

Figure 18:
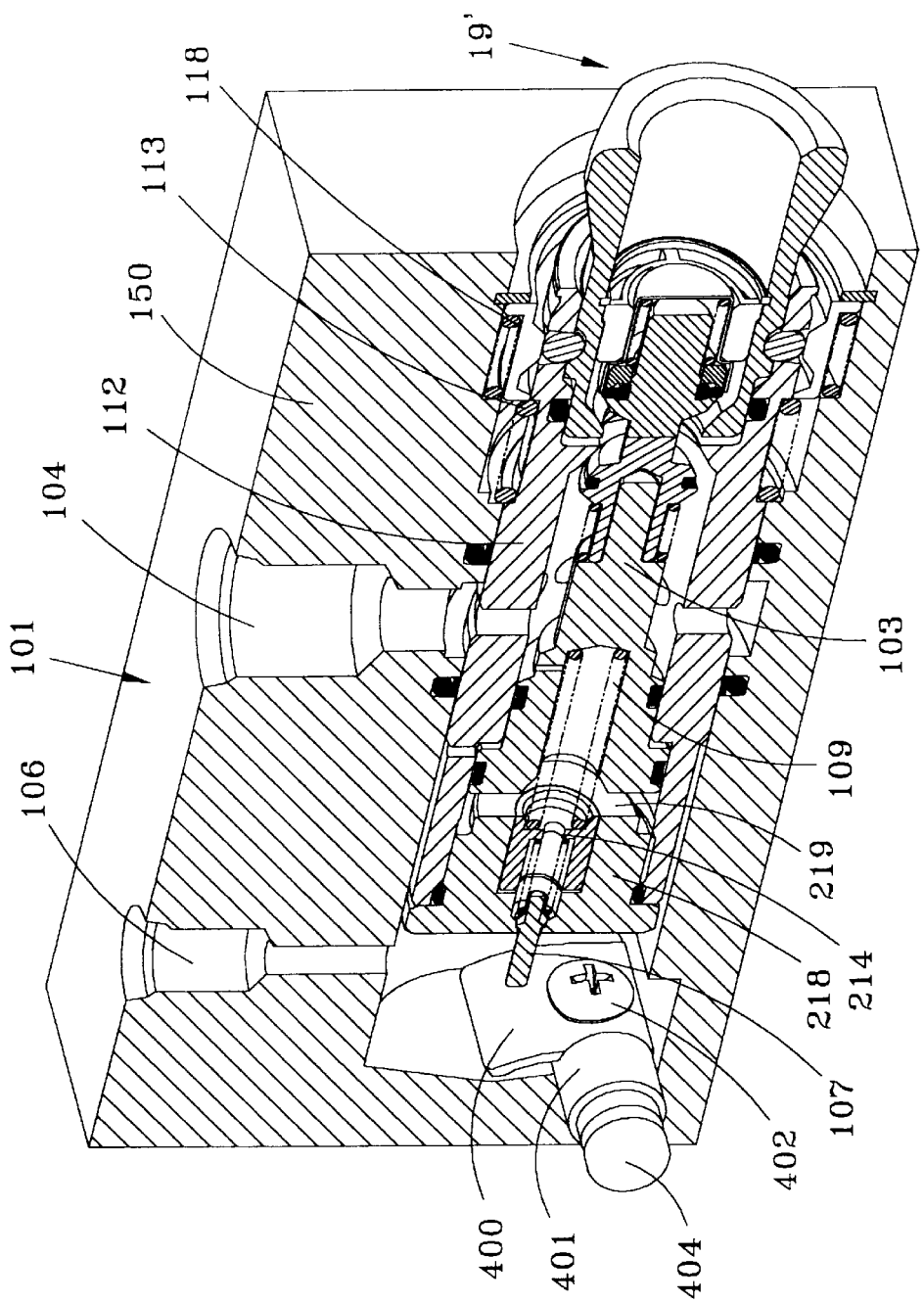
FIG. 18 is another embodiment of the coupling similar to that illustrated in FIGS. 9–16 with a lever operated pressure release mechanism.

FIG. 18 is another embodiment of the coupling similar to that illustrated in FIGS. 9–16 and 20 except that a lever operated pressure release mechanism is also included. Cam plate 400 operates the valve 107 when the rotating arm 401 is rotated. The cam plate 400 is affixed to the rotating arm by means of screws 402. Rotating arm 401 includes ends 404.

Figure 19:
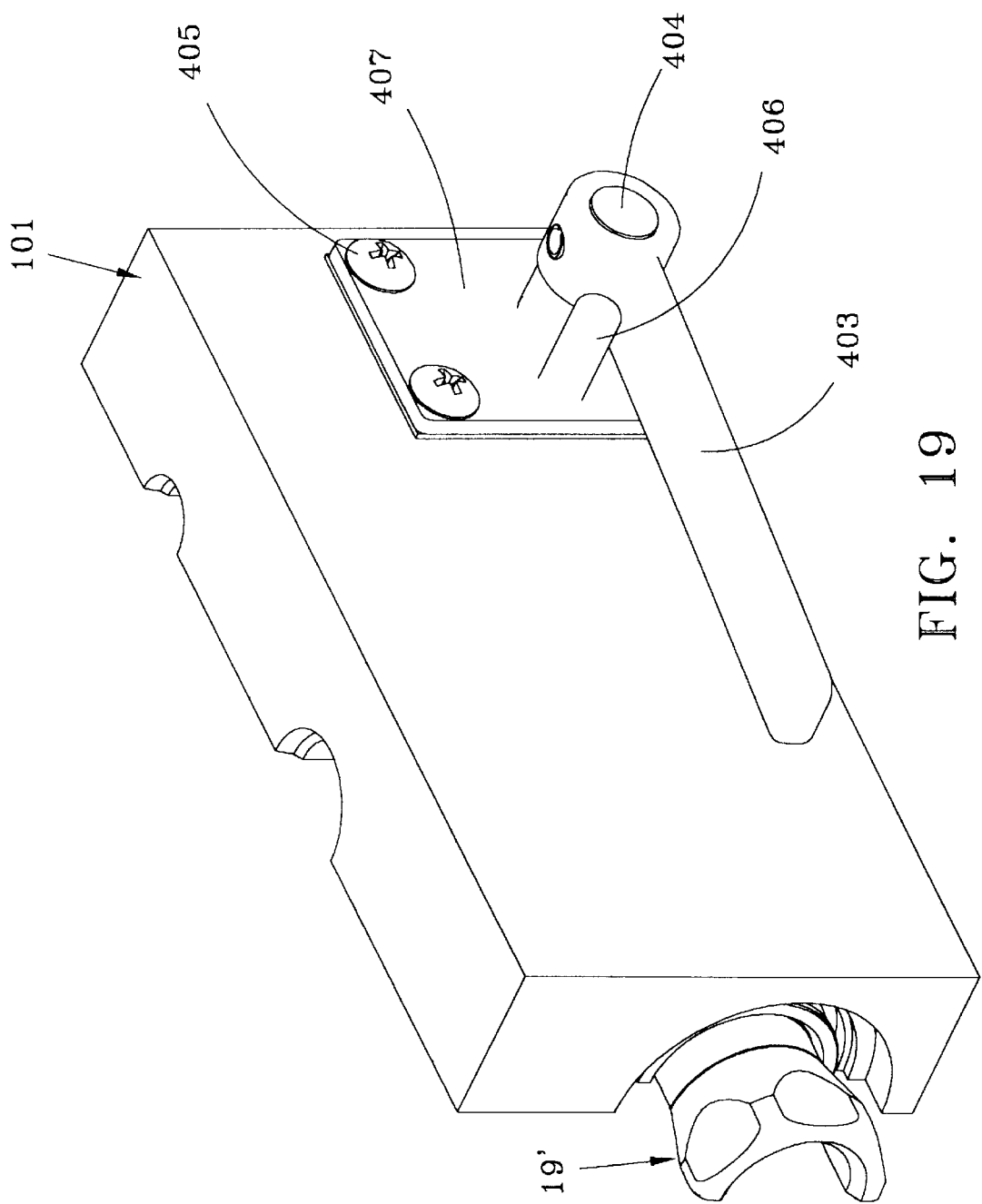
FIG. 19 is an external view of the coupling illustrated in FIG. 18 illustrating the handle.

FIG. 19 is an external view of the coupling illustrated in FIG. 18 illustrating the handle or lever 403. Stop 406 limits the rotation of the handle 403. Mounting plate 407 affixes the stop with respect to the female coupling 101. Screws 45 or other means may be used to affix the mounting plate 407 to the female half of the coupling 101.

Those skilled in the art will recognize that the invention as described herein is by way of example only and will enable many variations of the disclosed invention without deporting from the spirit and scope of the appended claims.

I claim:

1. A coupling comprising a male half and a female half; said female half includes a body and a movable inner body member; a relief valve positioning member affixed to said inner body member; a vent valve in said relief valve positioning member; said male half urging said movable inner body, said positioning member and said vent valve rearwardly; said vent valve engaging said body of said female half and venting said female half of said coupling enabling coupling of said male and female halves of said coupling.

2. A coupling as claimed in claim 1 wherein said vent valve is a tire valve.

3. A coupling as claimed in claim 1 further comprising locking means for locking said male and female halves of said coupling together.

4. A coupling as claimed in claim 1 wherein said female half includes a locking sleeve; said inner body member includes apertures; a locking ball; said locking balls residing partially in said apertures; a spring operable between said body of said female half and said locking sleeve urging said locking sleeve frontwardly; said locking sleeve movable rearwardly along with said inner body member when venting said female half of said coupling after said coupling is coupled.

5. A coupling as claimed in claim 1 further comprising cam means for venting said female half of said coupling.

6. A coupling as claimed in claim 1 wherein said female half further includes a cam; a rotating arm; said cam affixed to said rotating arm; and said cam engageable with said vent valve.

7. A coupling comprising a male half and a female half; said female half includes: a body and an inner body member, said inner body member movable within said body member, a vent valve positioning member affixed to said inner body member; a vent valve in said vent valve positioning member, a movable piston, a spring spacer, a first spring operable between said spring spacer and said vent valve, a second spring operable between said spring spacer and said piston, a chamber formed between said piston and said relief valve positioning member, said piston includes a passageway, a female valve movable relative to said piston, and, said body includes an inlet port and a vent port; said male half of said coupling engages and urges said inner body member and said relief valve positioning member rearwardly; and, said vent valve engages said body of said female member and vents said chamber permitting said female valve to open and said piston to move rearwardly.

8. A coupling as claimed in claim 7 wherein the female half further comprises locking means for locking said male and female halves together.

* * * * *

UNITED STATES PATENT AND TRADEMARK OFFICE
CERTIFICATE OF CORRECTION

PATENT NO : 5,937,899
DATED : August 17, 1999
INVENTOR(S) : Dennis Zeiber

It is certified that error appears in the above-identified patent and that said Letters Patent are hereby corrected as shown below:

Col. 7, line 12, delete "functional", and insert -- frictional --.

Col. 8, line 59, add a --.-- between "hereof" and "FIG. 20".

Col. 9, line 1, delete "filly", and insert -- fully --.

Signed and Sealed this

Twenty-eighth Day of December, 1999

Attest:

Q. TODD DICKINSON

Attesting Officer

Acting Commissioner of Patents and Trademarks